Figure 3:
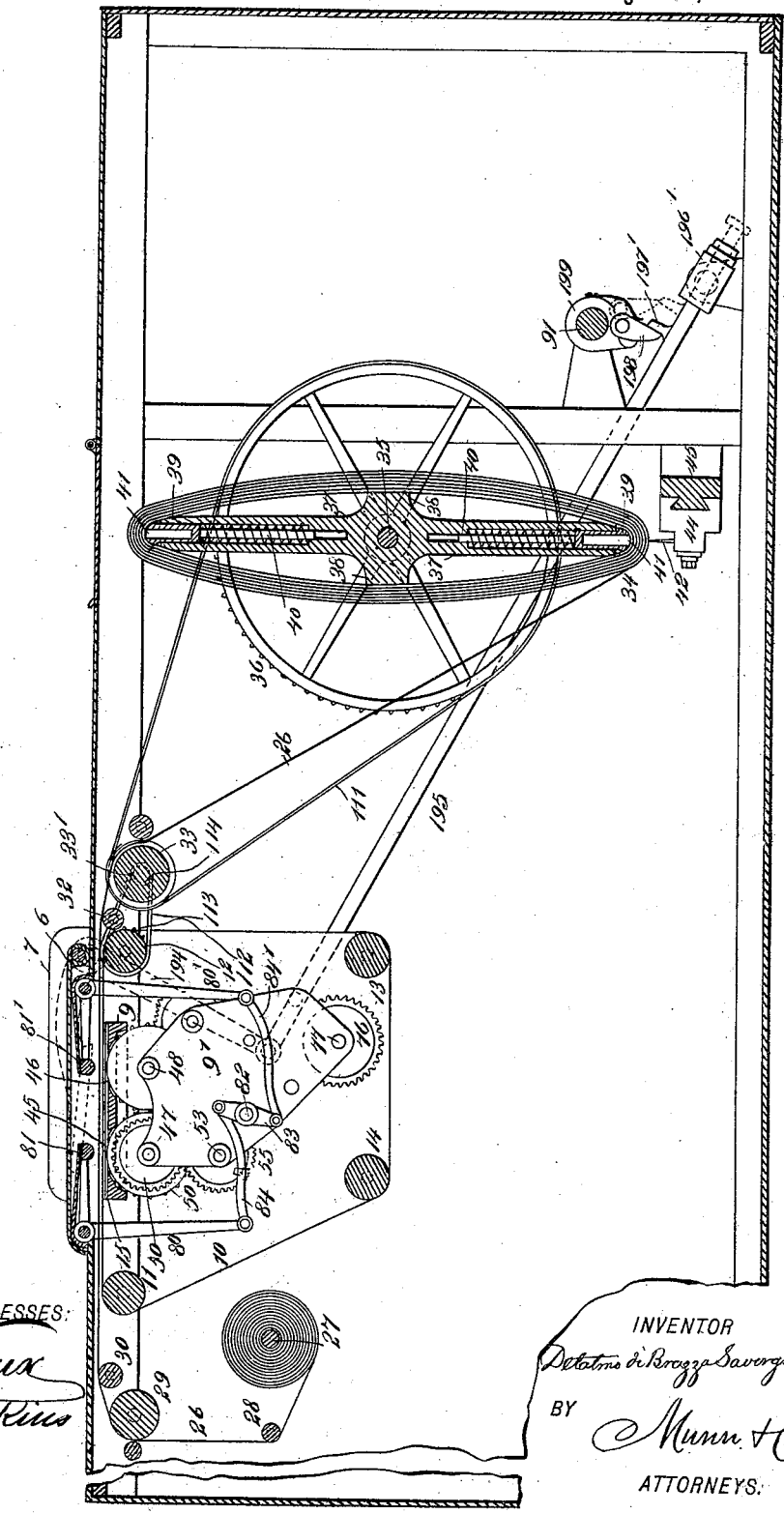

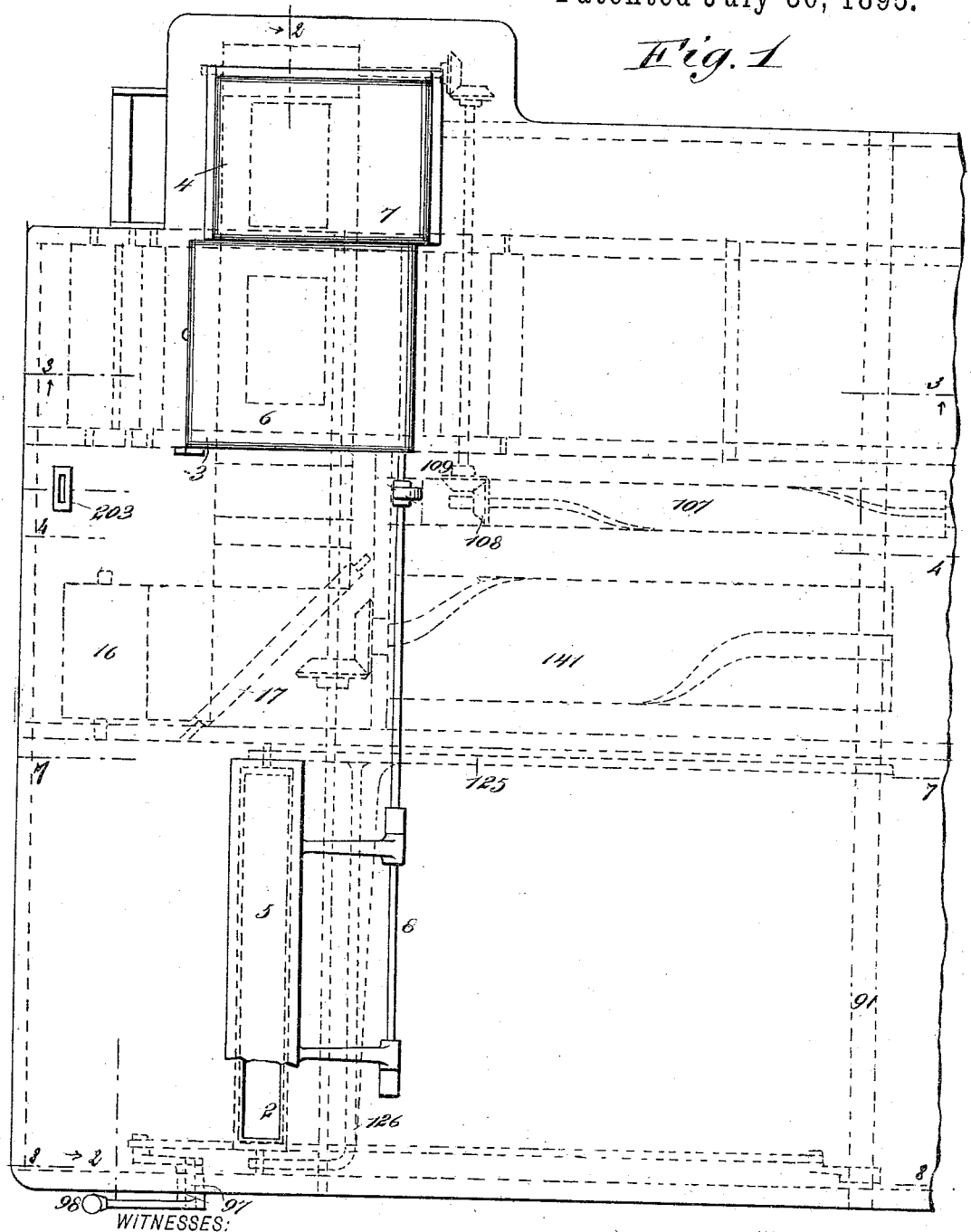

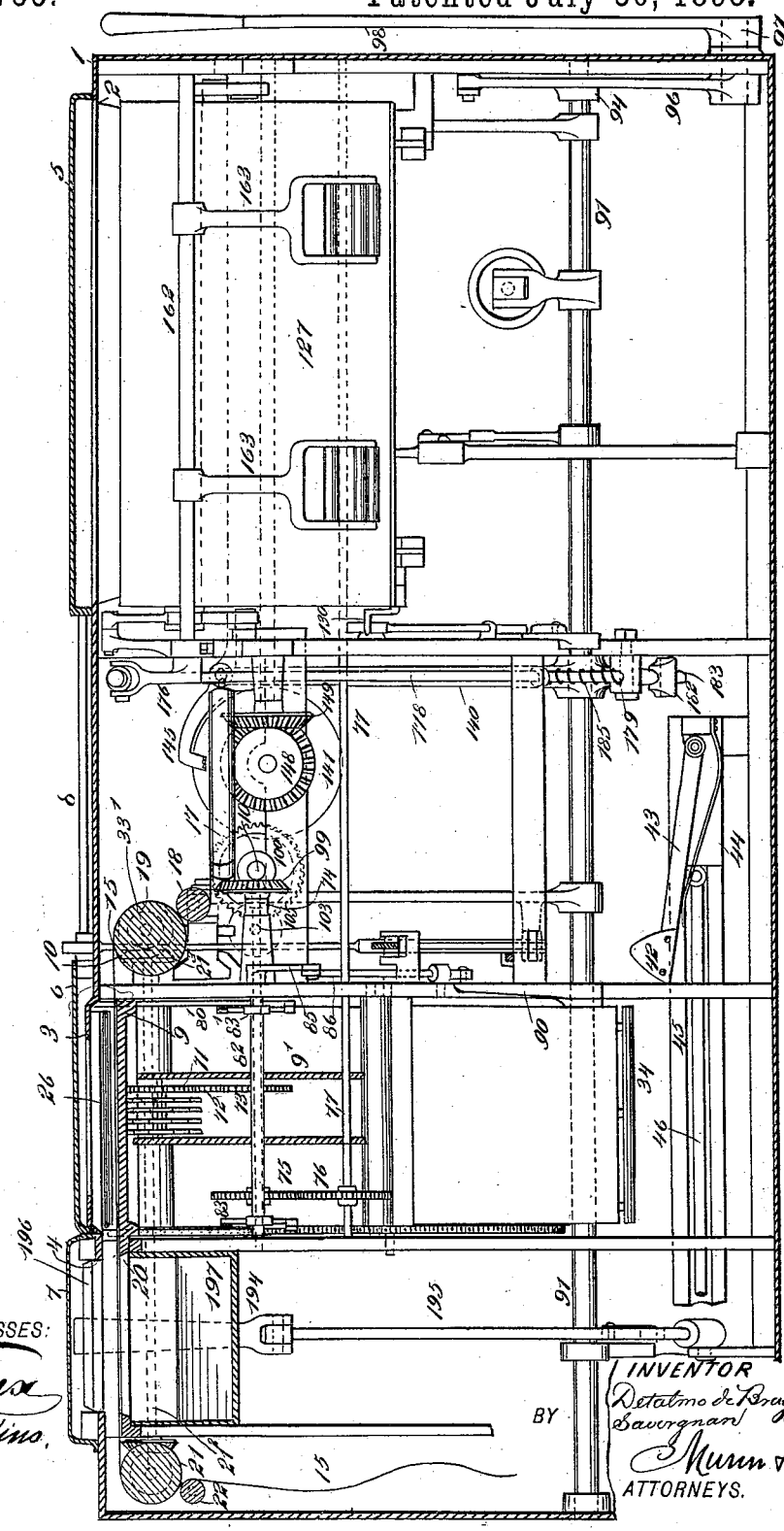

(No Model.) 18 Sheets—Sheet 3.

DETALMO DI BRAZZA SAVORGNAN.
COIN CONTROLLED REGISTERING MACHINE.

No. 543,755. Patented July 30, 1895.

WITNESSES:
C. Neveux
G. M. Hopkins

INVENTOR
Detalmo di Brazza Savorgnan
BY
Munn & Co.
ATTORNEYS.

(No Model.) 18 Sheets—Sheet 4.
DETALMO DI BRAZZA SAVORGNAN.
COIN CONTROLLED REGISTERING MACHINE.
No. 543,755. Patented July 30, 1895.
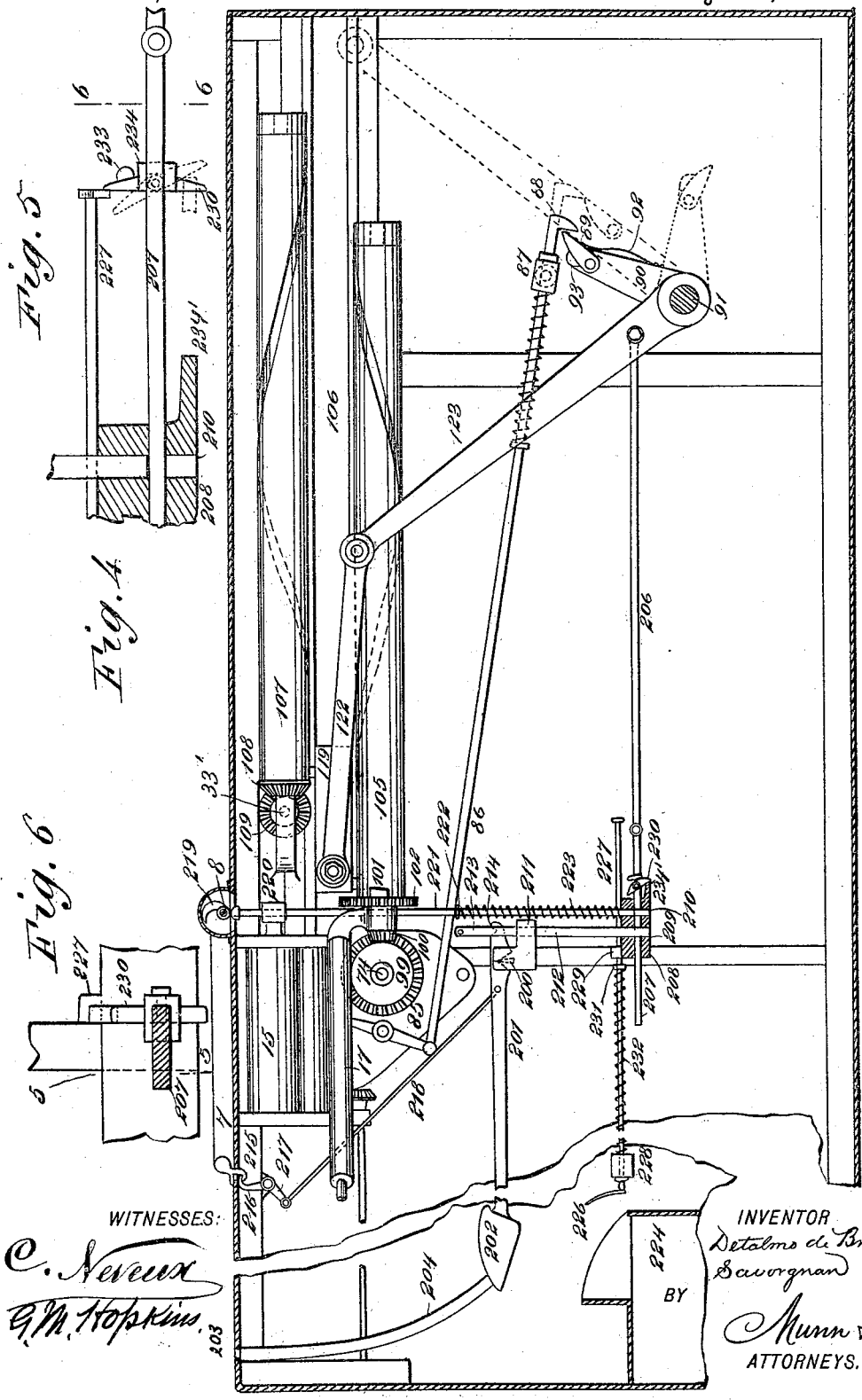
WITNESSES:
C. Neveux
G. M. Hopkins
INVENTOR
Detalmo di Brazza Savorgnan
BY
Munn & Co
ATTORNEYS.

(No Model.) 18 Sheets—Sheet 5.

DETALMO DI BRAZZA SAVORGNAN.
COIN CONTROLLED REGISTERING MACHINE.

No. 543,755. Patented July 30, 1895.

WITNESSES:
C. Neveux
G. M. Hopkins

INVENTOR
Detalmo di Brazza Savorgnan
BY
Munn & Co
ATTORNEYS.

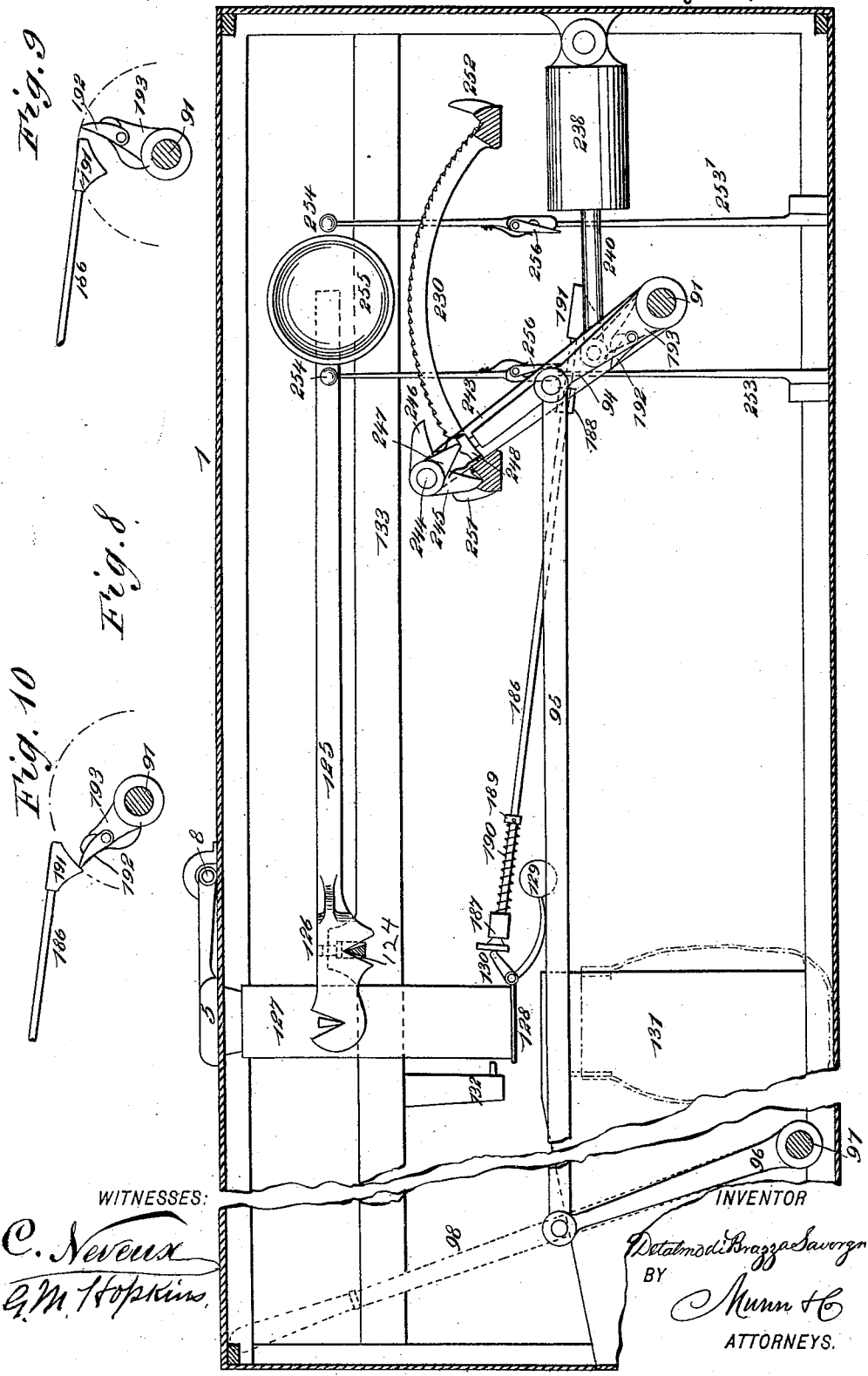

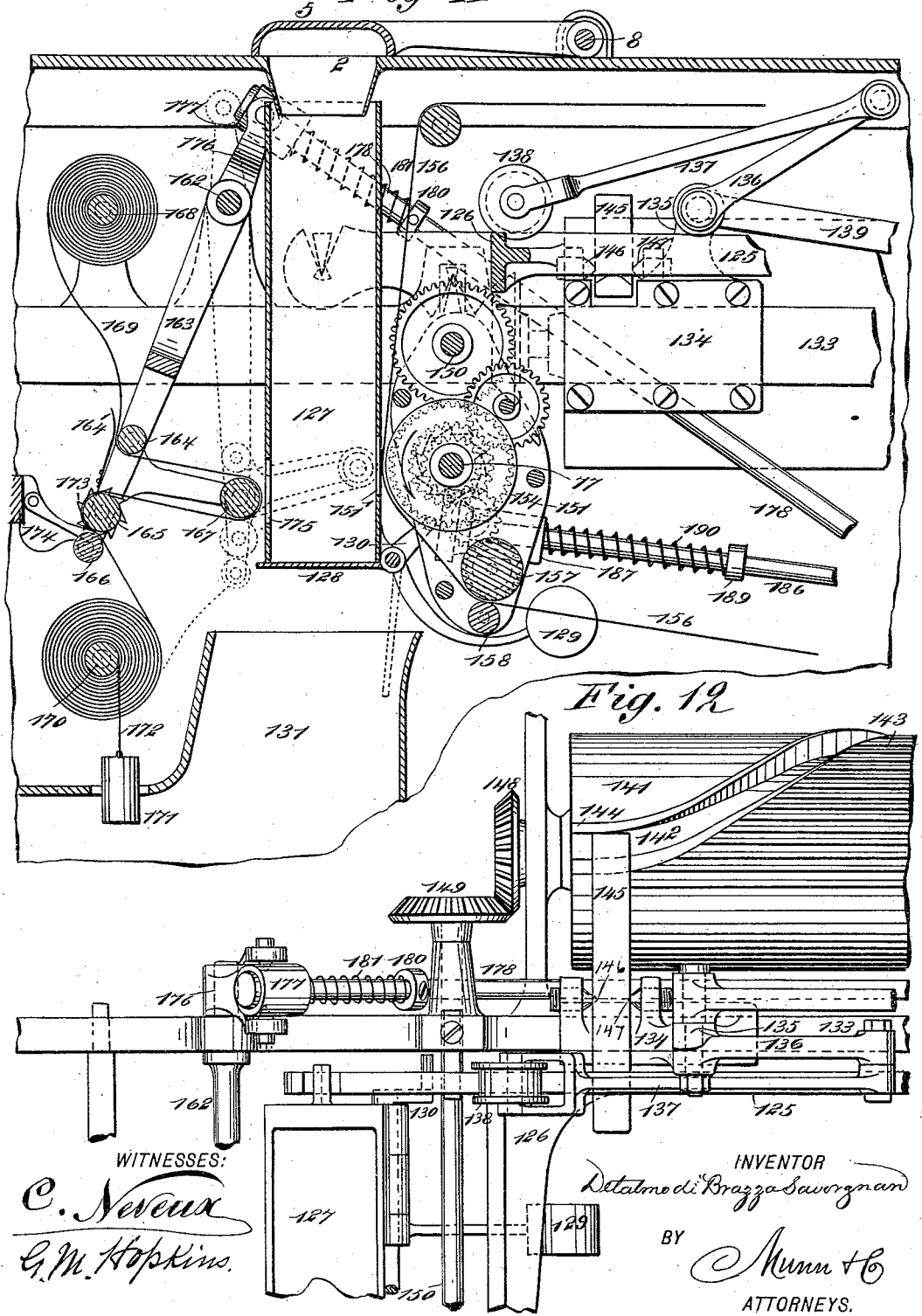

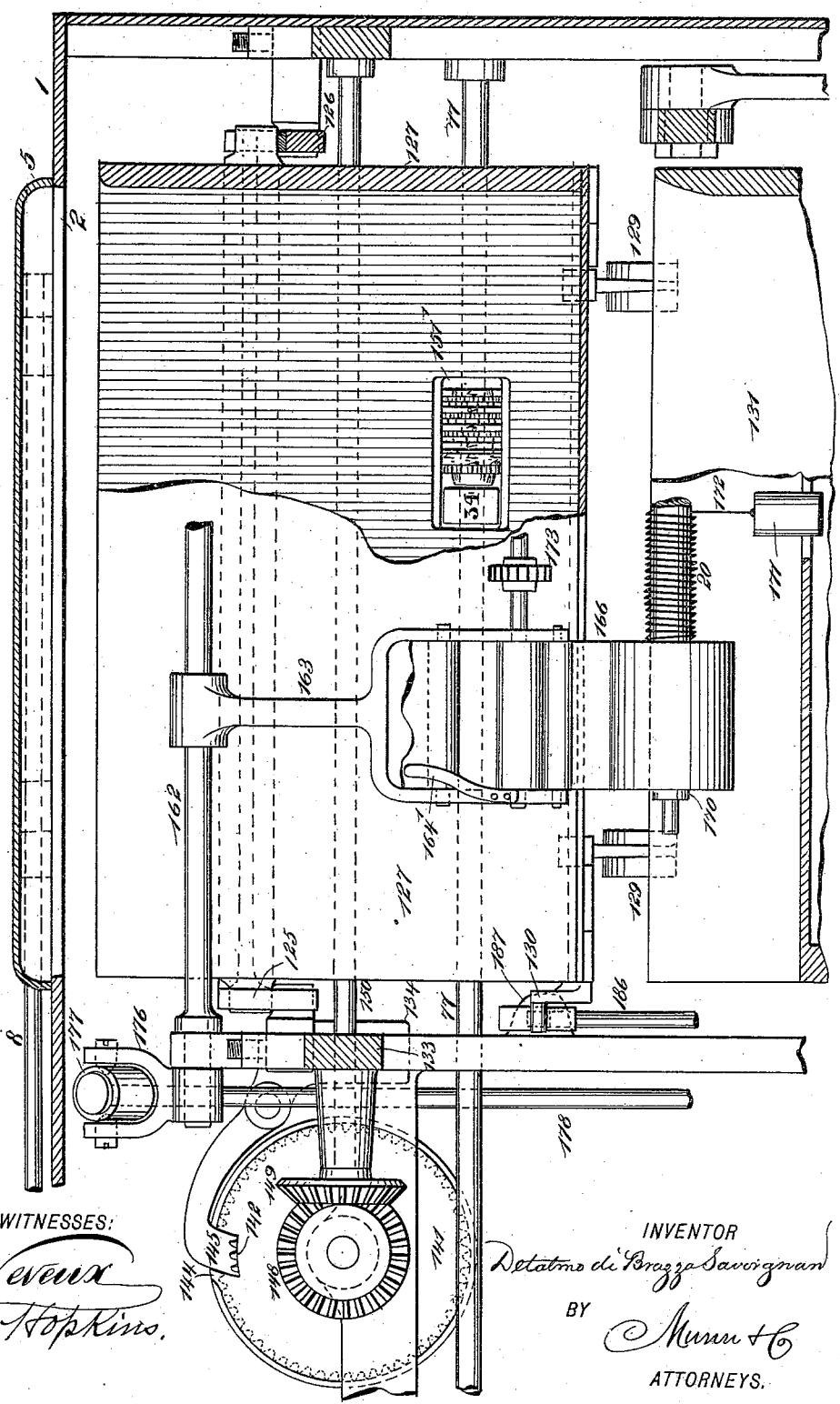

(No Model.) 18 Sheets—Sheet 9.

DETALMO DI BRAZZA SAVORGNAN.
COIN CONTROLLED REGISTERING MACHINE.

No. 543,755. Patented July 30, 1895.

WITNESSES:
C. Neveux
G. M. Hopkins.

INVENTOR
Detalmo di Brazza Savorgnan
BY Munn & Co
ATTORNEYS.

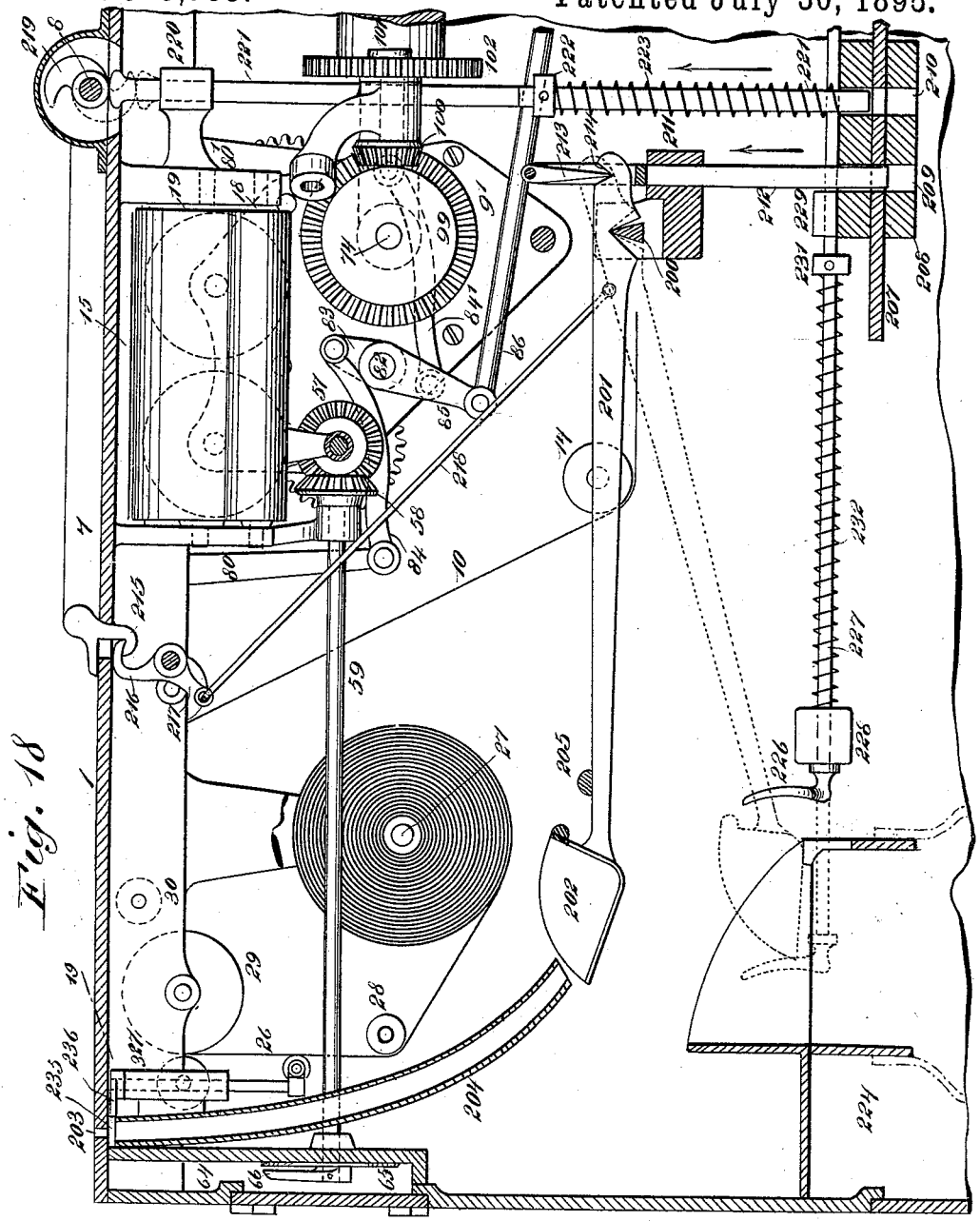

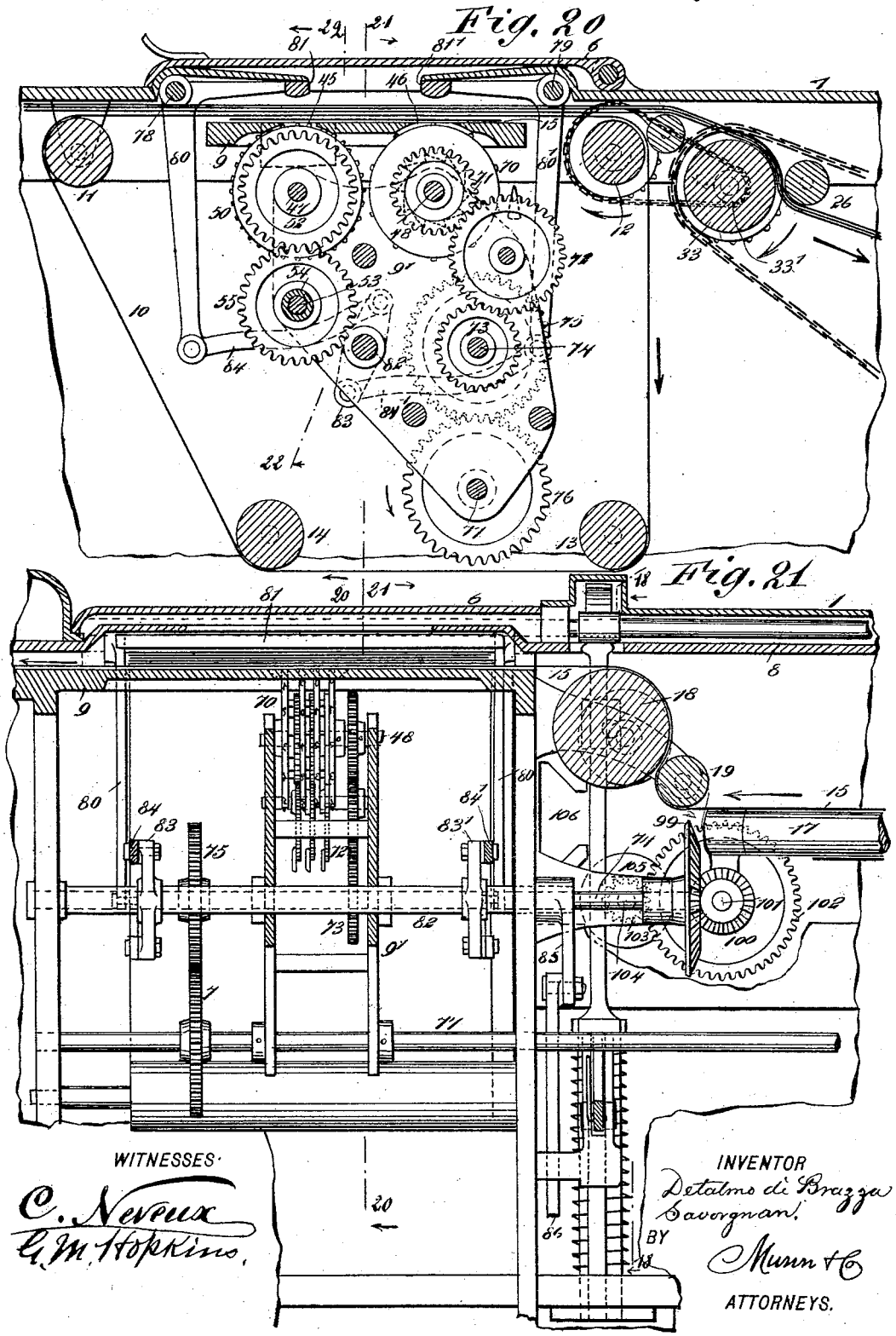

(No Model.) 18 Sheets—Sheet 12.
DETALMO DI BRAZZA SAVORGNAN.
COIN CONTROLLED REGISTERING MACHINE.

No. 543,755. Patented July 30, 1895.

WITNESSES:
C. Neveux
G. M. Hopkins

INVENTOR
Detalmo di Brazza Savorgnan
BY
Munn & Co
ATTORNEYS.

(No Model.) 18 Sheets—Sheet 13.

DETALMO DI BRAZZA SAVORGNAN.
COIN CONTROLLED REGISTERING MACHINE.

No. 543,755. Patented July 30, 1895.

WITNESSES
C. Neveux
G. M. Hopkins.

INVENTOR
Detalmo di Brazza Savorgnan
BY Munn & Co
ATTORNEYS.

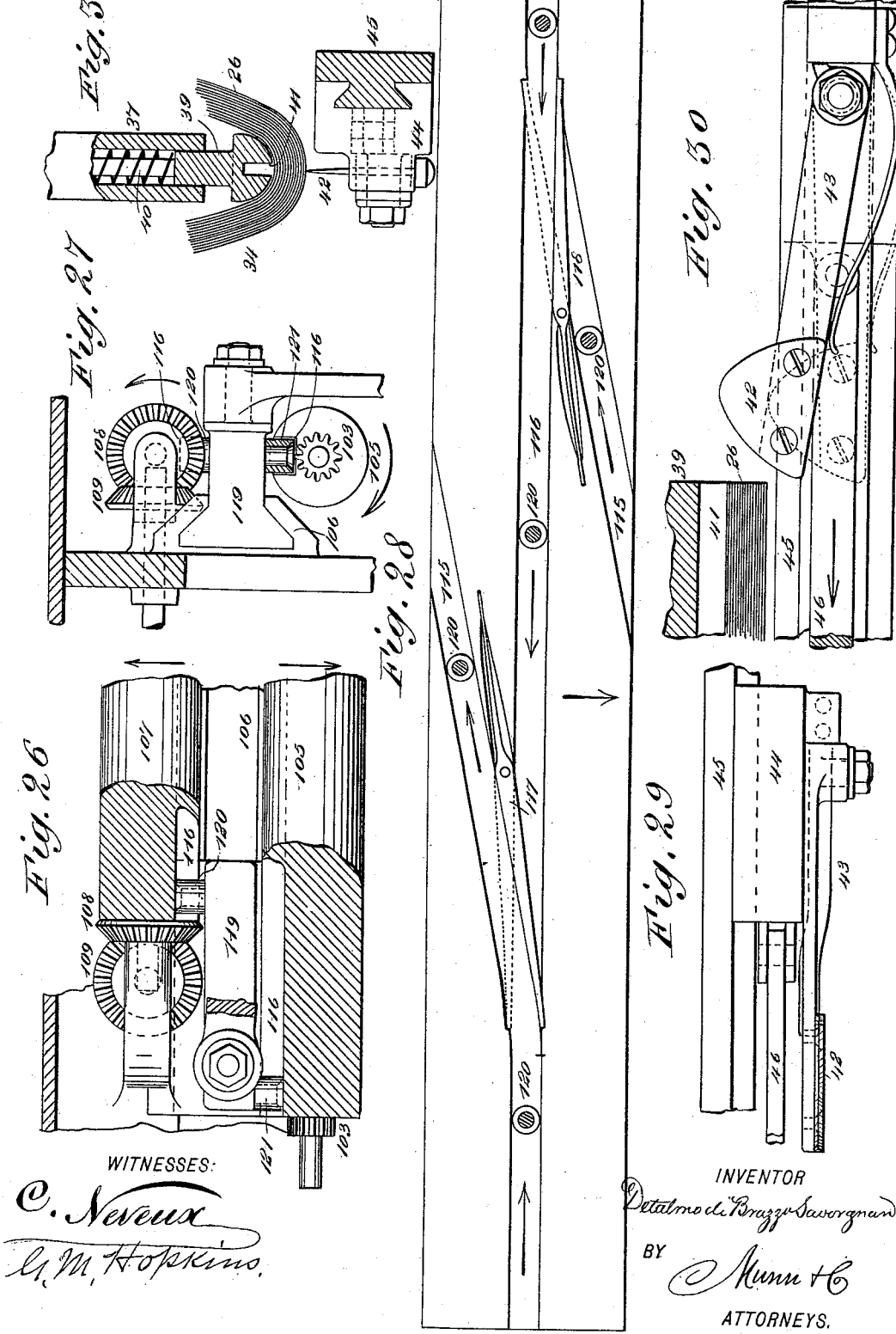

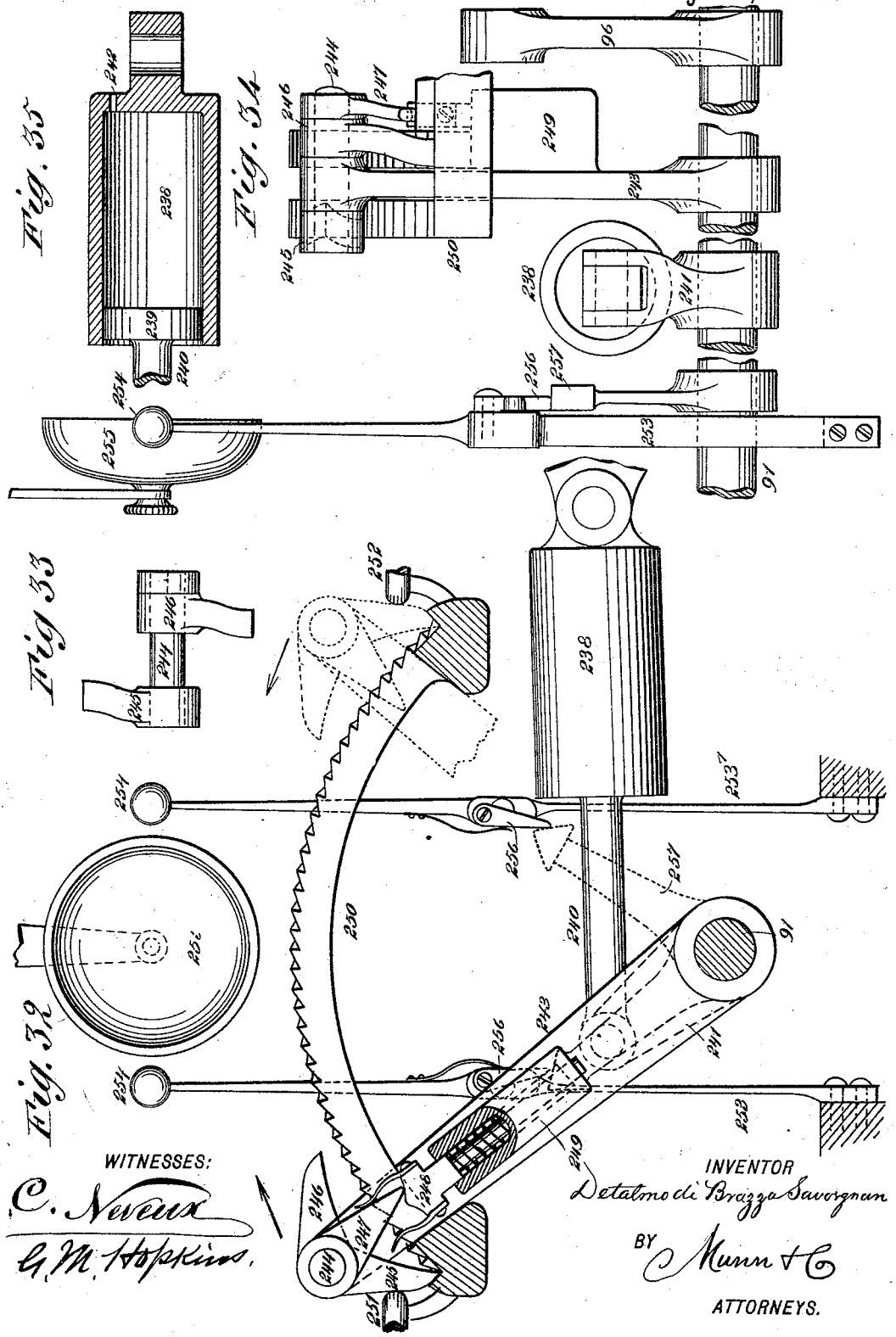

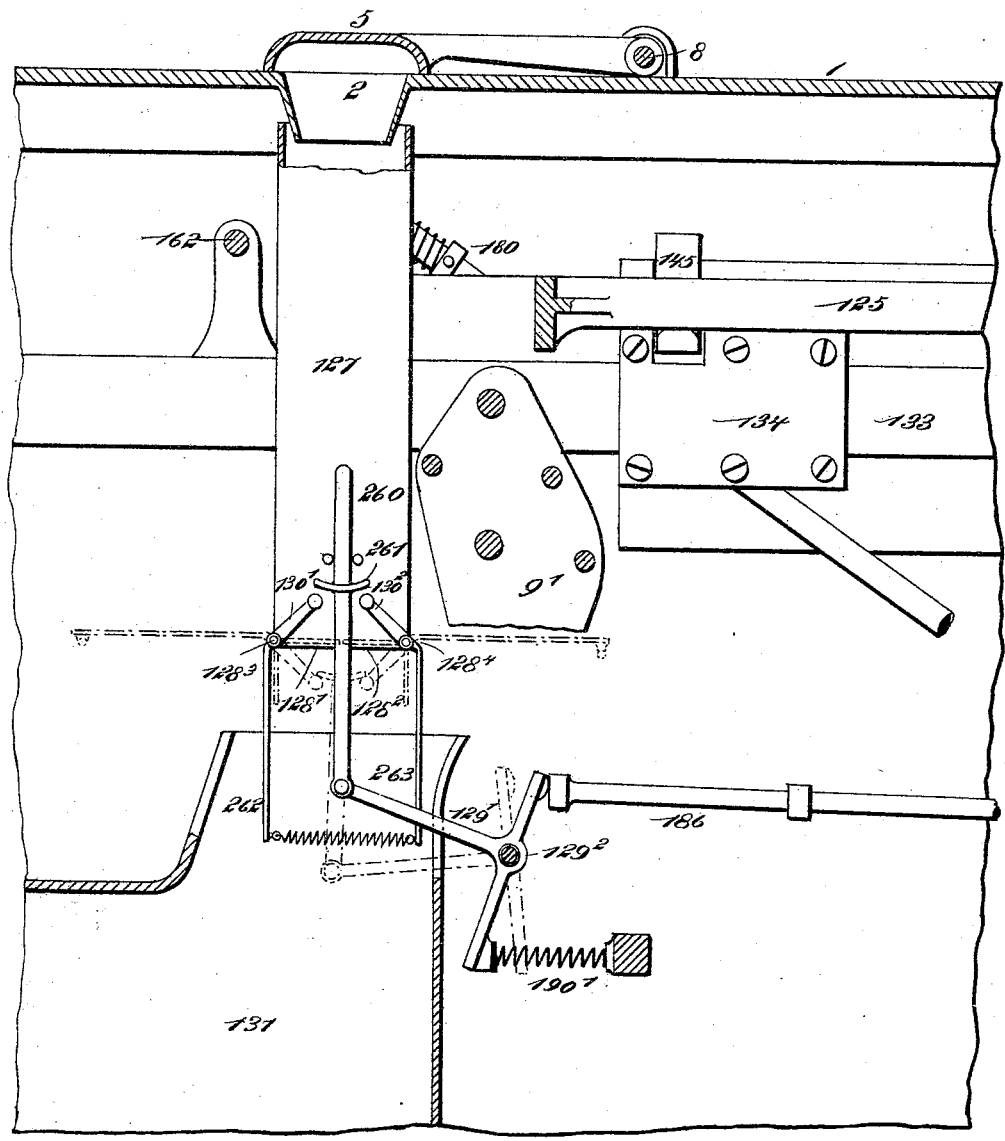

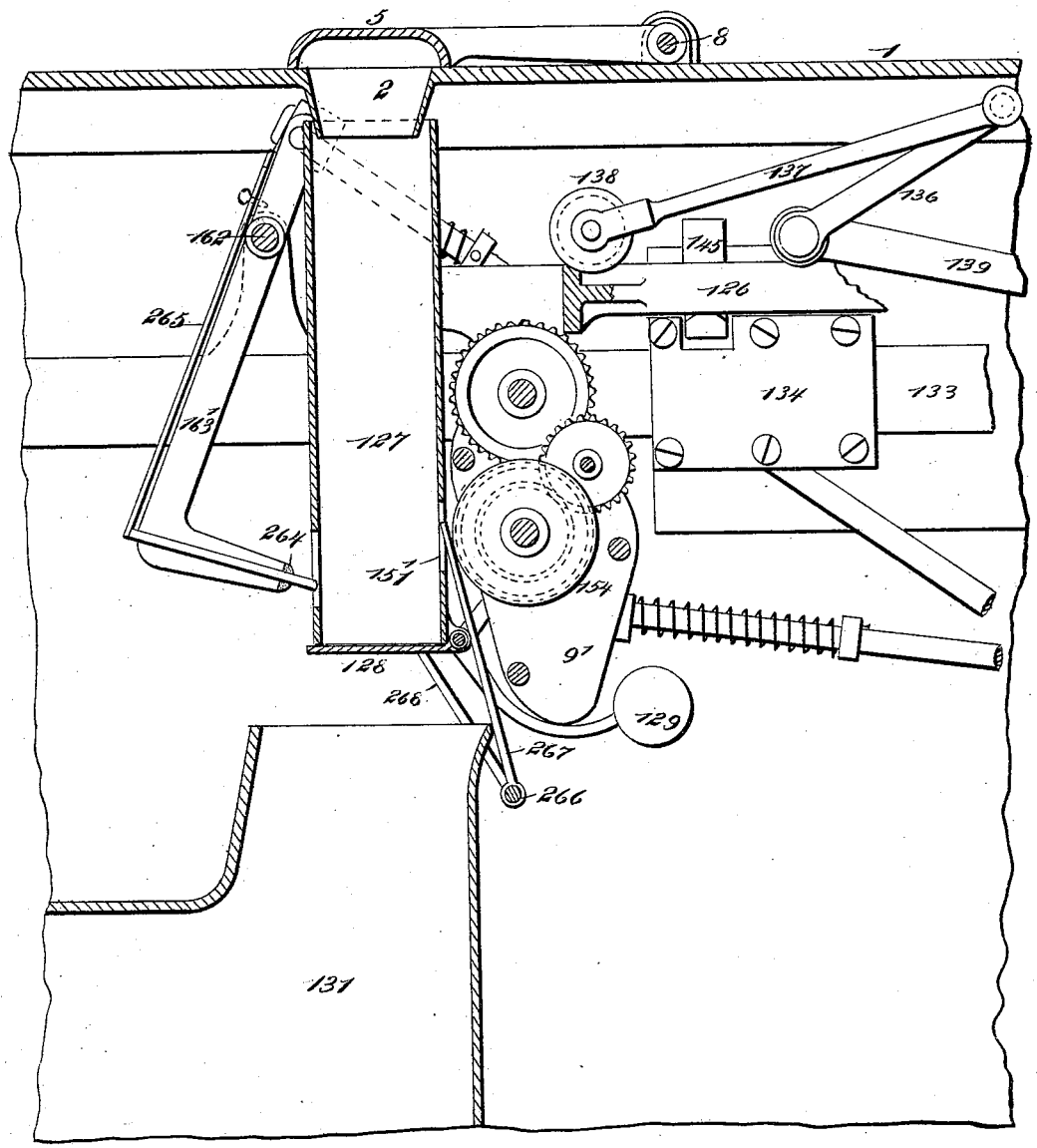

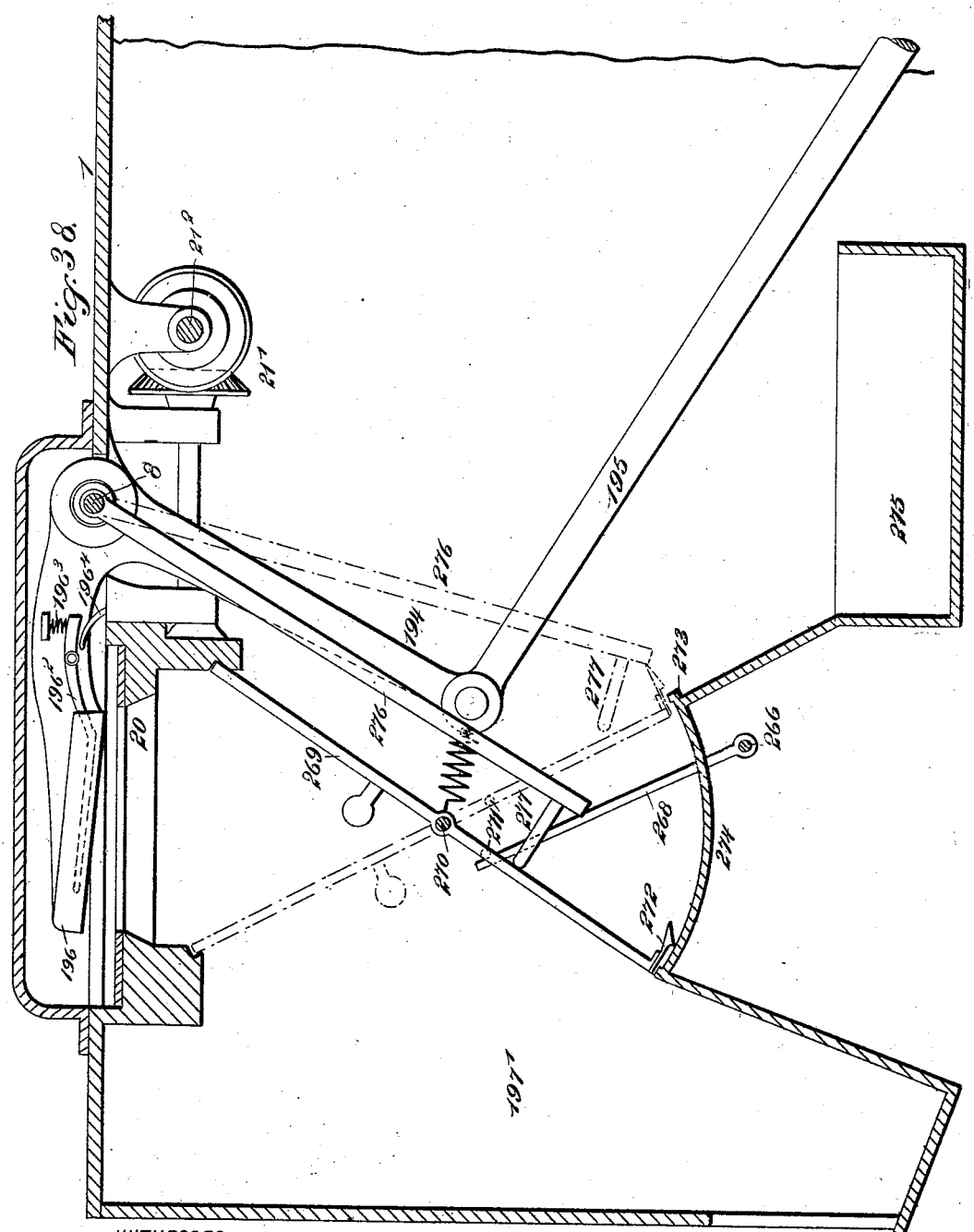

UNITED STATES PATENT OFFICE.

DETALMO DI BRAZZA SAVORGNAN, OF ROME, ITALY.

COIN-CONTROLLED REGISTERING-MACHINE.

SPECIFICATION forming part of Letters Patent No. 543,755, dated July 30, 1895.

Application filed November 24, 1894. Serial No. 529,822. (No model.)

*To all whom it may concern:*

Be it known that I, DETALMO DI BRAZZA SAVORGNAN, of Rome, Italy, have invented a new and Improved Coin-Controlled Registering-Machine, of which the following is a full, clear, and exact description.

The object of my invention is to construct a simple and effective registering-machine which may be used for various purposes, but which is more especially designed for registering letters, the machine to be placed at convenient points, so that letters can be registered where they are mailed, thereby obviating the necessity of going to the post-office in person.

My invention consists in a locked registering-table and letter-receiving box capable of being unlocked by a coin dropped into coin-operated mechanism and in mechanism for weighing and numbering the letter or package, dating, numbering, and delivering the receipt, and dropping the letter into the letter-box.

It also consists in a device for forming the paper band into a book, which becomes the letter-register.

It also consists in devices for preventing the machine from being operated when the supply of record-paper is exhausted, also in mechanism for controlling the different movements and operations, so that they must occur in regular sequence.

It also consists in various other details of construction, as hereinafter more fully described.

Reference is to be had to the accompanying drawings, forming a part of this specification, in which similar figures of reference indicate corresponding parts in all the views.

Figure 1:
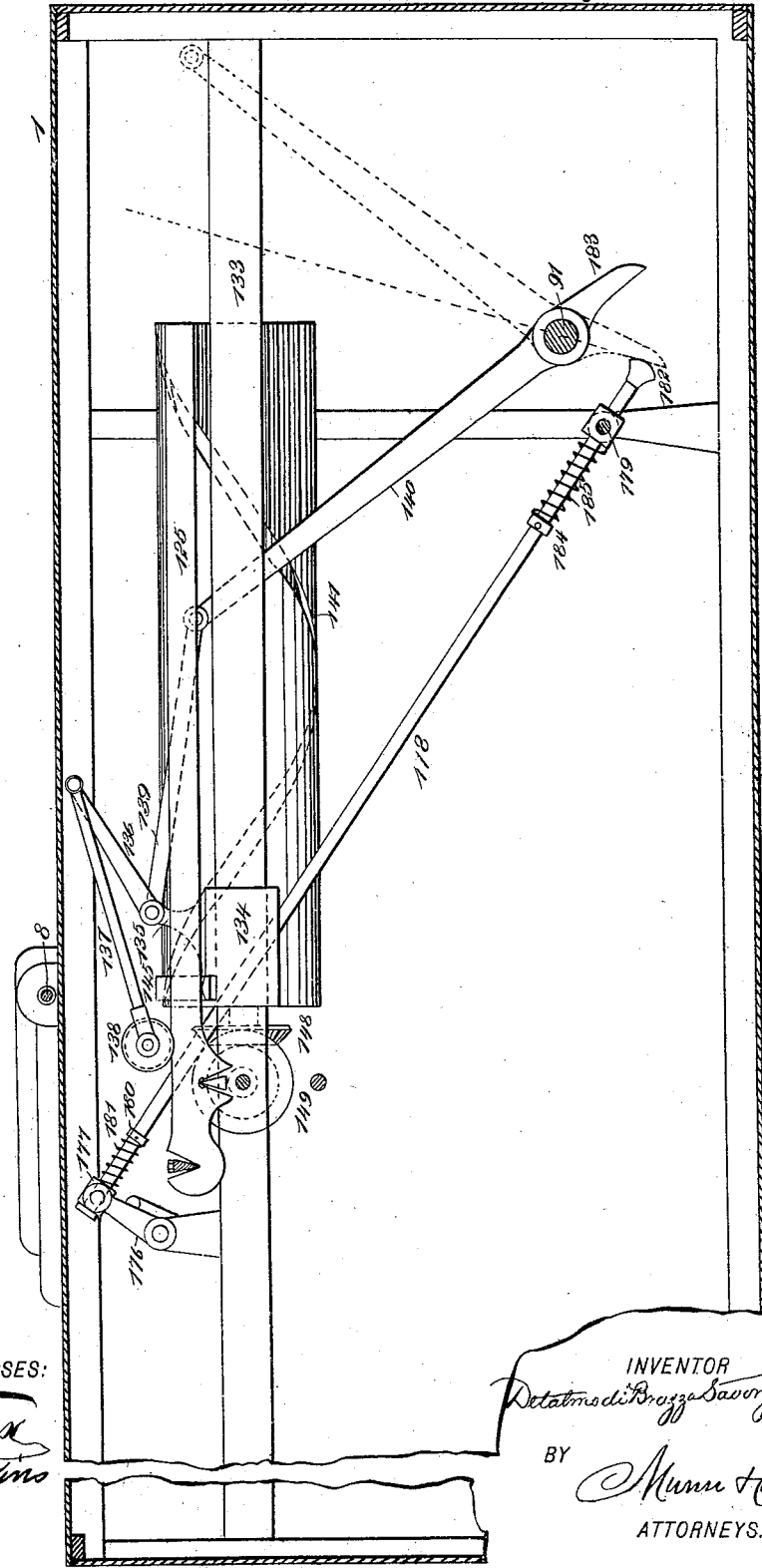
Figure 16:
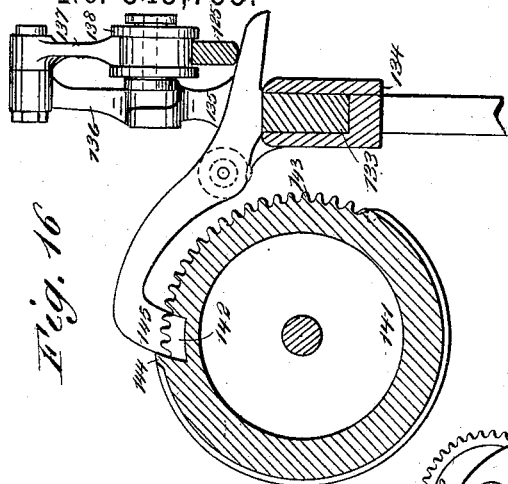
Figure 17:
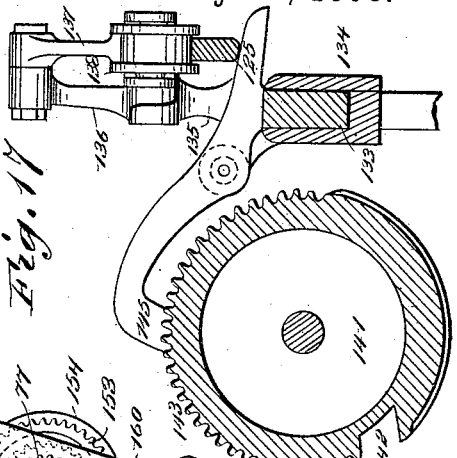
Figure 15:
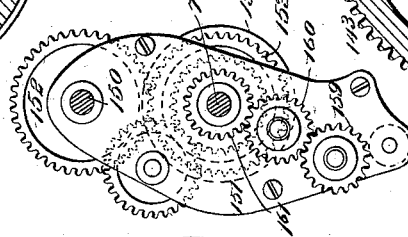
Figure 14:
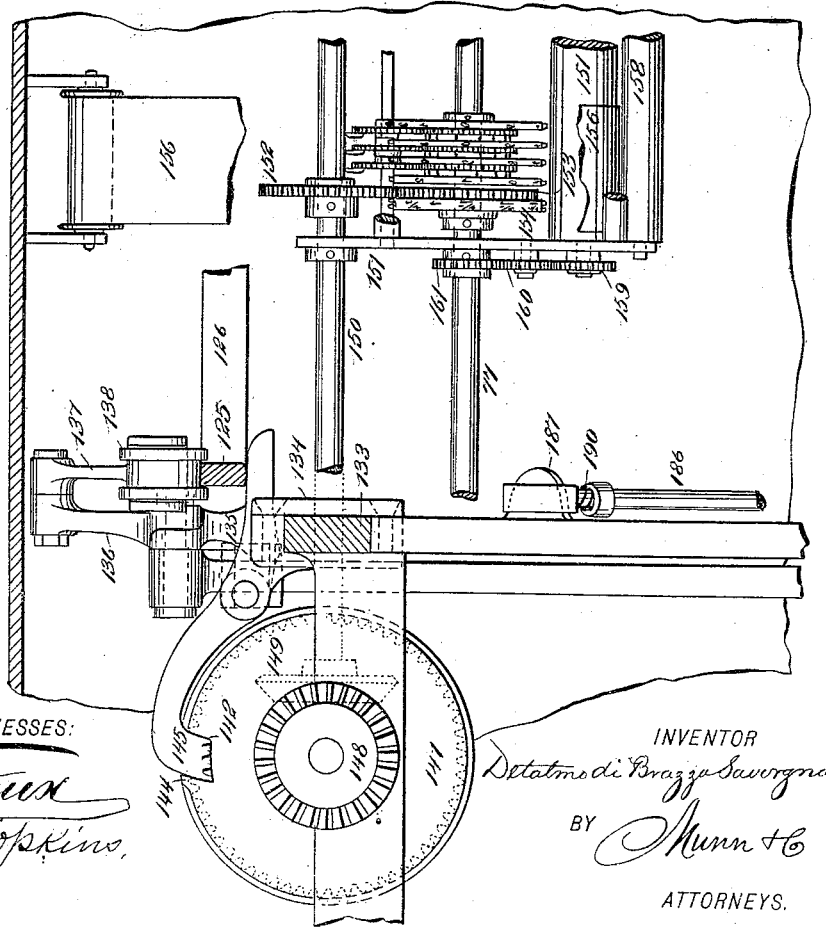
Figure 22:
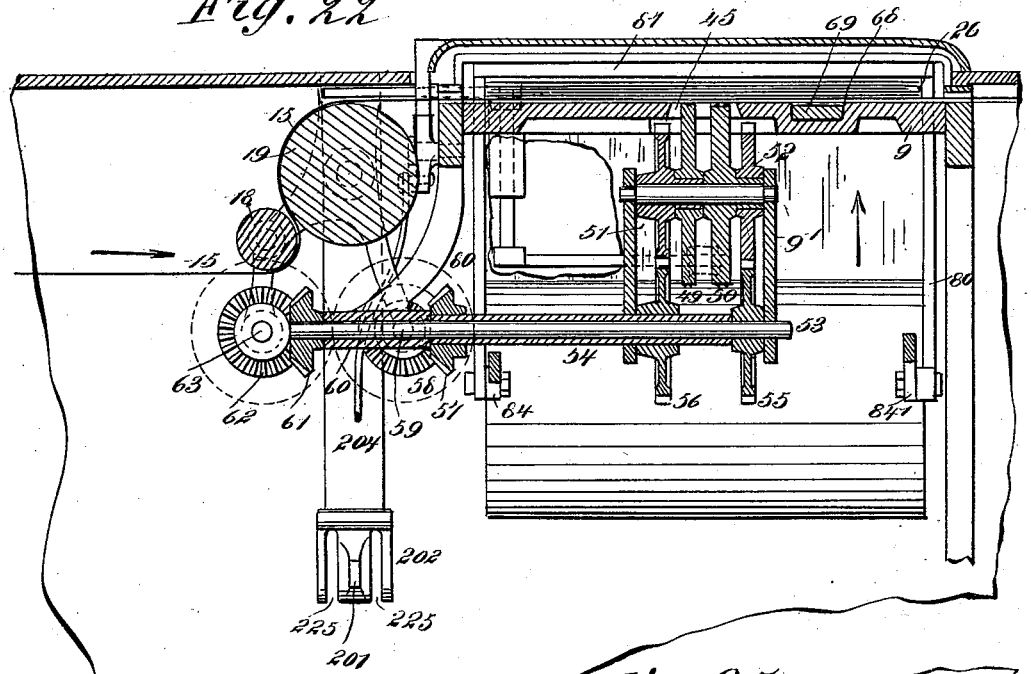
Figure 23:
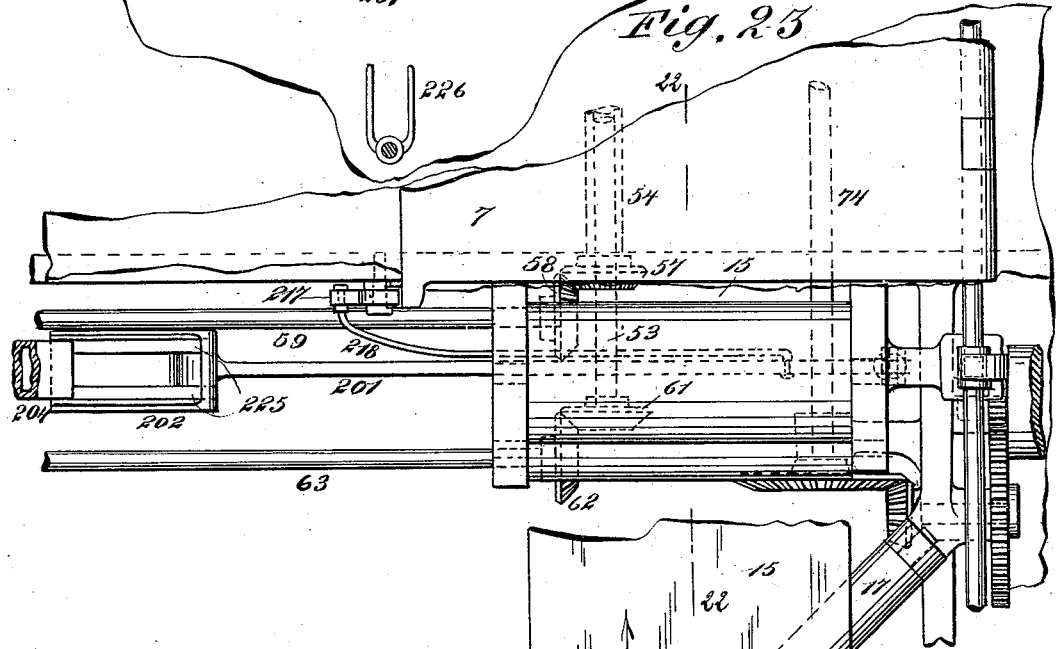
Figure 24:
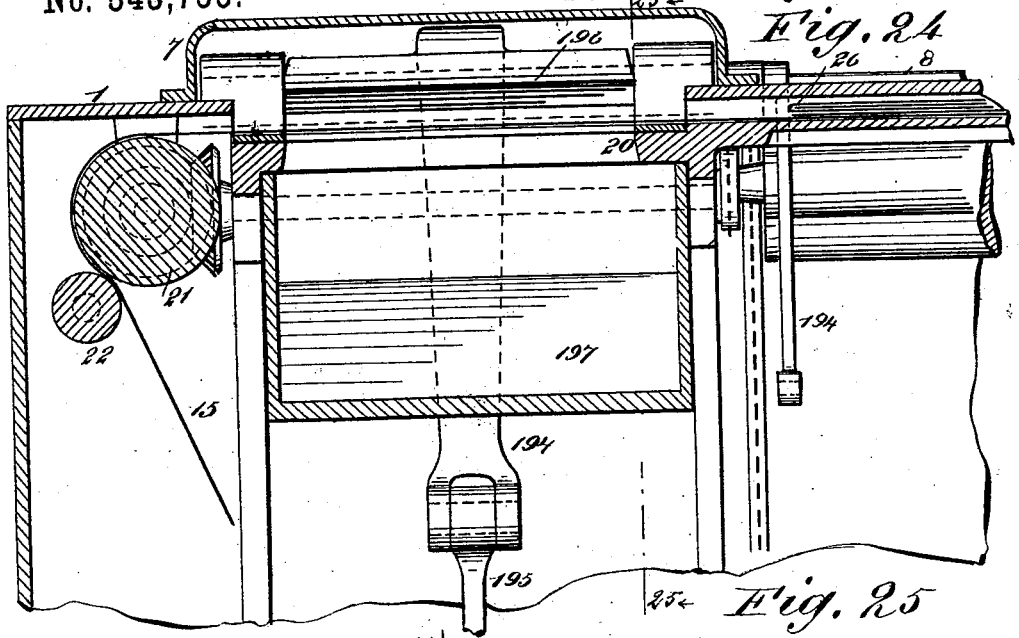
Figure 25:
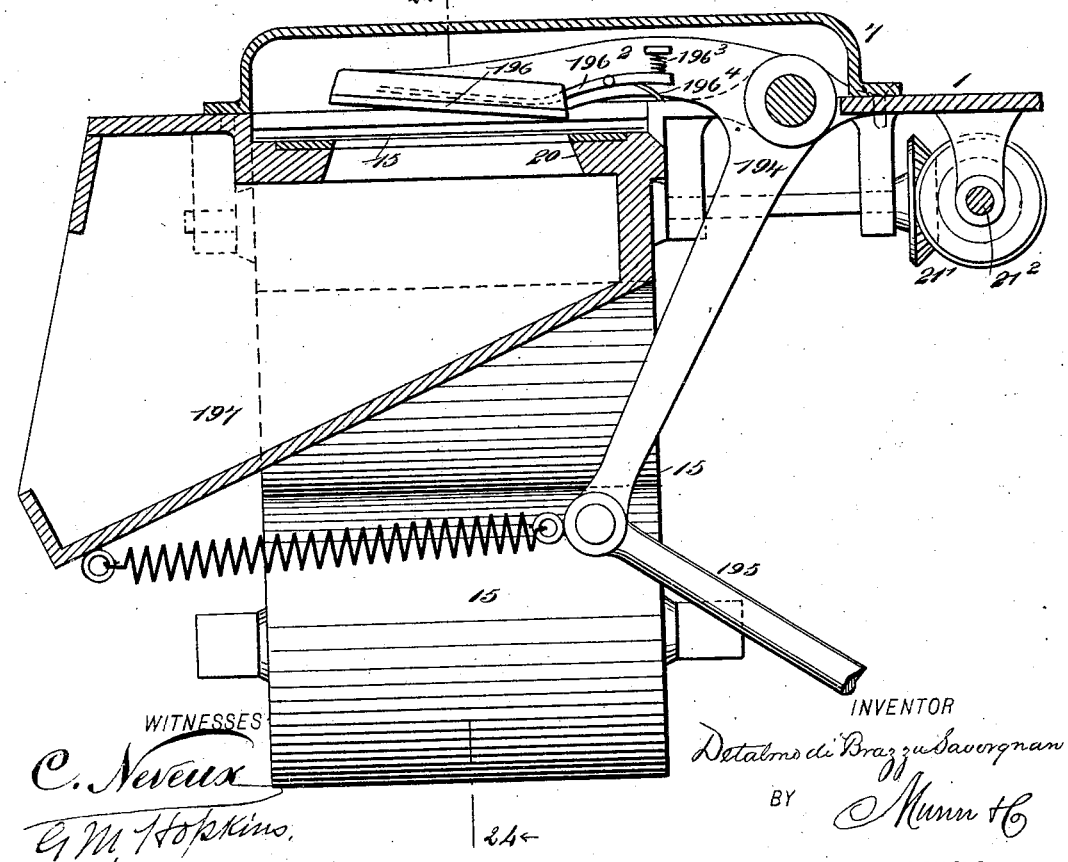

Figure 1 is a diagrammatic plan view showing the relation of various parts. Fig. 2 is a vertical longitudinal section taken on line 2 2 in Fig. 1. Fig. 3 is an enlarged detail side sectional elevation of the record-printing and record-filing apparatus, the section being taken on line 3 3 in Fig. 1. Fig. 4 is a vertical transverse section taken on line 4 4 in Fig. 1. Fig. 5 is a detail side sectional elevation of a part of the coin-discharging mechanism, the section being taken on line 5 5 in Fig. 6. Fig. 6 is a vertical transverse section taken on line 6 6 in Fig. 5. Fig. 7 is a vertical transverse section taken on line 7 7 in Fig. 1. Fig. 8 is a vertical transverse section taken on line 8 8 in Fig. 1. Fig. 9 is a detail side elevation of a part of the letter-box door-opening mechanism, showing the device in readiness for operating the door. Fig. 10 is a similar view showing the device about to release the door to allow it to close. Fig. 11 is an enlarged side sectional elevation of the letter or package numbering mechanism, showing portions of the letter-weighing mechanism. Fig. 12 is a partial plan view of the weighing and weight-recording mechanism. Fig. 13 is an enlarged front elevation, partly in section, of a portion of the weighing mechanism and letter or package numbering mechanism. Fig. 14 is an enlarged front elevation of a portion of the machine, showing the numbering mechanism, with a portion of the weighing mechanism partly in section. Fig. 15 is a detail side elevation of the numbering mechanism. Fig. 16 is a vertical transverse section of a portion of the weighing mechanism. Fig. 17 is a similar view showing the parts in different relation to each other. Fig. 18 is a side elevation, partly in section, of the coin-receiving devices and locking and releasing mechanism. Fig. 19 is a sectional plan view of the automatic cut-off for preventing the insertion of coins when paper is exhausted from the machine. Fig. 20 is an enlarged sectional side elevation of the printing mechanism, the section being taken on line 20 20 in Fig. 21. Fig. 21 is a front sectional elevation of the same, the section being taken on line 21 21 in Fig. 20. Fig. 22 is a sectional side elevation of the dating mechanism, the section being taken on line 22 22 in Fig. 23. Fig. 23 is a plan view of a portion of the mechanism for handling the paper record-strip. Fig. 24 is a vertical longitudinal section of the receipt-delivering device, taken on line 24 24 in Fig. 25. Fig. 25 is a vertical transverse section of the same, taken on line 25 25 in Fig. 24. Fig. 26 is a partial front elevation, partly in section, of the cam-roller mechanism for imparting motion to the numbering mechanism and inking-ribbon. Fig. 27 is an end elevation of the same, showing parts in section. Fig. 28 is a detail view of one of the cam-rollers developed on a plane, showing the latch mechanism. Fig. 29 is a plan view of the knife-carrying slide. Fig. 30 is a side elevation of the same. Fig. 31 is an end elevation of the knife-carrying slide and knife, showing the relation of the same to the record-receiving reel and record wound thereon. Fig. 32 is a side elevation of the safety device and alarm-bell. Fig. 33 is a detail inverted plan view of one of the double pawls. Fig. 34 is a front elevation of the safety device, and Fig. 35 is a longitudinal section of the air-cylinder for modifying the motion of the operating-lever. Fig. 36 represents a modification showing the letter-receptacle and mechanism connected therewith, and Figs. 37 and 38 represent the letter-receptacle and a safety device for preventing the delivery of the receipt when the letter is absent from the letter-receptacle.

The top of the casing 1 is provided with apertures 2, 3, and 4 having covers 5, 6, and 7, respectively. The covers 5 and 6 are secured to a rod 8, journaled in bearings on the top of the casing, so that both covers must be opened or closed simultaneously. The cover 7 is designed to be opened only when repairs or adjustment are required.

Below the aperture 3 is supported a table 9, over which extends an endless inking-ribbon 10, which is guided and supported by the rollers 11 12 13 14, Fig. 3. Over the table and inking-ribbon extends a paper strip 15, which is unwound from the roller 16, and, after passing over the diagonal roller 17 to change its direction, passes under the guide-roller 18 and over the guide-roller 19, thence over the inking-ribbon 10 and table 9, over the die 20, over the feed-rollers 21, and between feed-rollers 21 and 22. It will thus be seen that the paper strip 15 extends lengthwise of the casing 1 in its passage through the main portion of the machine.

A paper strip 26 extending crosswise of the table 9 and over the strip 15 and inking-ribbon 10 at right angles to the strip 15 is stored on the roller 27, and passes over the guide-rollers 28 29 30, being pressed on the roller 29 by a small roller 31. The strip 26 after passing over the table 9 passes over the guide-rollers 32 33, and is finally wound on the reel 34, supported on the shaft 35 journaled in the casing 1 and provided with a sprocket-wheel 36, to which motion is imparted in the manner presently to be described.

The reel 34 has two equal arms 37 projecting in opposite directions from its shaft and two projections 38 extending from opposite sides of the shaft at right angles to the arms 37. The ends of the arms 37 are grooved to receive the followers 39, which are guided by rods 40 and pressed outwardly by spiral springs surrounding the rods. The followers 39 are each provided with a longitudinal groove 41 to allow space for the knife-edge while the paper is being cut and to allow the binding-twine to pass through. A knife 42 is attached to a spring-pressed arm 43, carried by a slide 44, arranged to move on a guide 45, supported in a fixed position in the casing 1. The slide 44 is furnished with a handle 46, by means of which it is drawn back and forth during the operation of cutting the paper.

The paper strip 26 consists of a strip of paper doubled upon itself and containing between the folds thereof a strip of impression-paper. This arrangement insures the exact duplication on the lower part of the strip of the writing on the upper part of the strip and forms a receipt, which is to be detached and sent to the recipient of the letter for signature.

In the table 9 there are two apertures 45 46, and below the table is supported a frame 9', in which are secured horizontal rods 47 48. On the rod 47 are loosely placed dating-wheels 49 50, which are respectively provided with spur-wheels 51 52 fixed to them. In one side of the frame 9' is journaled one end of a shaft 53, the middle portion of which extends through a sleeve 54 journaled in the opposite side of the frame 9'. On the shaft 53 is secured a spur-wheel 55, which engages the spur-wheel 52, and on the sleeve 54 is secured a spur-wheel 56, which engages the spur-wheel 51. The sleeve 54 is furnished with a bevel-wheel 57, which is engaged by a bevel-wheel 58 on the shaft 59 extending through the side of the casing 1. The outer portion of the shaft 53 revolves in a journal-bearing 60 and carries at its outer end a bevel-wheel 61, which is engaged by the bevel-wheel 62 on the shaft 63, extending through the side of the casing 1. Casing 1 is provided with a recess 64, Fig. 18, containing dials 65, through which the ends of the shafts 59 and 63 project. On the end of the shaft 59 is secured an index 66, the said index serving to adjust the wheel 49, carrying on its periphery figures for printing the day of the month, while the index 67 on the shaft 63 serves for adjusting the wheel 50, which carries characters or abbreviations representing the month. In a recess 68 in the table 9 are placed blocks 69, on which are engraved figures representing the year and also figures representing the number of the machine.

On the rod 48 is placed a series of number-wheels 70, the first of the series being provided with a spur-wheel 71, which is fixed to it and meshes into the intermediate spur-wheel 72, the said intermediate spur-wheel 72 being engaged by a spur-wheel 73 on the shaft 74, and shaft 74 carries a spur-wheel 75, which takes motion from a spur-wheel 76 on the shaft 77.

In the top of the casing 1 under the cover 6 are journaled two rock-shafts 78 79, which extend across the path of the paper strip 26 at right angles thereto. The rock-shaft 78 is provided at opposite ends with right-angled levers 80, whose longer arms project downwardly into the casing, while their shorter arms reach over the table 9 and are attached to the ends of a platen-bar 81, which extends over the date-wheels 49 50 and over the typeblock 69. Similarly the rock-shaft 79 is provided with right-angled levers 80', having long arms projecting down into the casing and shorter arms projecting over the table 9 and provided with a platen-bar 81', which extends over the number-wheels 70. It will be observed that the levers 80 80' are oppositely arranged with respect to each other.

In the frame 9' and in cross-bars in the casing 1 is journaled a rock-shaft 82, on which are secured two cross-arms 83 83'. Opposite ends of the cross-arm 83 are connected by connecting-rods 84 84' with the longer arms of the levers 80 80' at one side of the table 9, and the cross-arm 83' is connected by connecting-rods 84 84' with the longer arms of the levers 80 80' at the opposite side of the table 9. Shaft 82 is provided with a crank-arm 85, to which is pivoted one end of the connecting-rod 86, the other end of which slides in a guide 87, attached to a fixed portion of the machine, and the extreme end of the rod 86 is furnished with a toe 88, engaged by the dog 89, pivoted to the side of an arm 90, secured to the main or operating rock-shaft 91, Fig. 4. The dog is pressed by a spring 92 against a lug 93 projecting from the side of the arm 90.

The main rock-shaft 91 is journaled in the casing 1 and serves to operate most of the movable parts of the machine. It is provided with an arm 94, to which is jointed one end of the connecting-rod 95, the other end of which is pivoted to the arm 96, secured to the inner end of the short rock-shaft 97, which is journaled in the end wall of the casing 1 and carries on its outer end the hand-lever 98.

The numbering mechanism having the number-wheels 70 receives its motion through a bevel-wheel 99 on the shaft 74, a bevel-pinion 100 meshing into the bevel-wheel and carried by the short shaft 101, a spur-wheel 102 mounted on this shaft, and a pinion 103 mounted on the shaft 104 of the cam-roller 105, the said pinion 103 engaging the spur-wheel 102. The cam-roller 105 is journaled in bearings in the main frame of the machine and is arranged parallel with and below a grooved guide 106, supported by the frame of the machine. Above the guide 106 and parallel with it is journaled a cam-roller 107. The cam-roller 107 carries a miter-wheel 108, which engages a miter-wheel 109 on the shaft 33' of the roller 33. Shaft 33' carries a sprocket-wheel 110, which receives the chain 111, passing around the sprocket-wheel 36 on the shaft 35 of the reel 34.

Roller 12, which is one of the set for supplying the inking-ribbon 10, is provided with a sprocket-wheel 112 for receiving the chain 113, which is carried by the sprocket-wheel 114 on the shaft 33'. Motion is imparted to the inking-ribbon 10 by this mechanism. The roller 21 receives motion through motor-wheels 21', the shaft 21², and miter-wheels 21³ from the shaft 33'.

The cam-rollers 105 and 107 are alike, with the exception of having spiral grooves extending in opposite directions around them. These rollers are developed on a plane surface in Fig. 28. In this figure the spiral groove 115, which extends once around the roller, communicates at its ends with a straight groove 116, extending the entire length of the roller. At the junction of the ends of the spiral groove with the straight groove are pivoted latches 117 118, having spring ends which extend into recesses in the side of the roller and have their bearings in slots at the ends of the recesses. The said latches in their normal position are closed against the walls of the slots.

In the guide 106 is placed a slide 119, which carries two studs 120 121, each provided with a roller, which fit in the grooves 115 116. The stud 120 projects into the groove in the cam-roller 107 and the stud 121 projects downwardly into the groove in the cam-roller 105. When the slide 119 moves in one direction, the studs slide over the latches into the spiral grooves, turning the cam-rollers in the direction indicated by the arrows, and in passing out of the spiral grooves into the straight grooves the studs pass the latches 118, which confine them in the straight grooves, thus preventing the turning of the cam-rollers on the return stroke of the slide 119. On returning to the point of starting the studs carried by the slide 119 pass the latches 117 and are again in position for another outward movement through the spiral grooves 115.

The numbering apparatus is of the usual construction, being provided with a series of number-wheels and with carrying mechanism.

Slide 119 is connected by a link 122 with an arm 123, secured to the shaft 91, so that whenever the said shaft is oscillated the slide will move forward and return, thereby causing the cam-rollers 105 107 to revolve in opposite directions, as already described.

On the knife-edge 124, supported in a fixed position in the casing, is poised the scale-beam 125, the shorter arm of which is provided with an auxiliary lateral arm 126, which is bent at right angles at its extremity, and the short arm and auxiliary lateral arm are each provided with a V-shaped notch to receive the knife-edges projecting from the ends of the letter-receiver 127. The letter-receiver is thus suspended below the opening 2 in the top of the casing, so that letters may be dropped through the said opening into the receiver when the cover 5 is opened. The bottom 128 of the letter-receiver 127 is hinged and provided with a counterweight 129 for holding it normally closed. It has also an arm 130 for swinging open the bottom and discharging the letter into the letter-box 131, in the manner presently to be described. The frame of the machine is provided with a stop 132 for limiting the swinging movement of the letter-receiver.

In the casing 1, parallel with the scale-beam, is secured the bar 133, on which is placed a slide 134, capable of moving freely along the length of the said bar. The slide 134 has an upward projection 135, to which is pivoted a jointed arm 136, which is movable on its pivot, but held in the position of use by friction. To one end of this arm is pivotally connected one end of the rod 137, the other end of which is forked to receive the weight-roller 138, which turns on a pin extending through the arms of the fork and through the weight-roller 138. Slide 134 is connected by a link 139 with an arm 140, carried by the shaft 91, Fig. 7. The jointed arm 136 is moved in one direction or the other when it is desired to change the adjustment of the scale-weight 138.

In the casing 1, parallel with bar 133, is journaled a cylinder 141, having in its surface a spiral groove 142, extending from one end to the other and making one turn around the cylinder. The said cylinder 141 is also provided with a series of longitudinal grooves 143 extending from the side of the groove 142 to the end of the cylinder. The side of the groove 142 opposite the side communicating with the grooves 143 is provided with a flange 144, which projects beyond the periphery of the cylinder and acts as a guard to prevent the dog 145 from jumping out of the groove 142, in which it works, when it returns from the longitudinal groove to the spiral groove. The dog 145 is pivoted delicately on points 146 147, carried by the slide 134, and is capable of swinging freely in a plane at right angles to the bar 133. The end of the dog 145 which is prolonged beyond the pivotal point extends over the bar 133 and under the scale-beam 125, so that when the longer arm of the scale-beam preponderates the dog 145 will be lifted out of the groove 142, as shown in Fig. 16; but its upward movement is limited by the striking of the dog on the bar 133, so that when the dog is moved lengthwise of the cylinder 141 the teeth on the end of the dog will enter the grooves 143 in the cylinder, and while the slide 134 and dog 145 can move lengthwise of the cylinder 141 the cylinder is prevented from turning by the dog.

The shaft of the cylinder 141 carries a miter-wheel 148, which engages a miter-wheel 149 on the shaft 150, extending parallel with the letter-receiver 127 and journaled in the frame 151 of the letter-stamping mechanism. Shaft 77, which is journaled in the frame 9' and receives motion from shaft 74, which operates the numbering mechanism, already described, is also journaled in the frame 151.

On the shaft 150, within the frame 151, is secured a spur-wheel 152, which meshes into a spur-wheel 153 of the same diameter, mounted loosely on the shaft 77 and carrying a number-wheel 154, having engraved on its periphery whole and fractional numbers representing the weights of letters, as determined by the scale in the manner to be hereinafter described.

On the shaft 77, adjoining the spur-wheel 153, is secured a number-wheel 155 representing units, and adjoining the units-wheel are wheels for tens, hundreds, and thousands. The peripheries of these wheels project into an opening 151, in the side of the letter-receiver 127 a sufficient distance to print on the letter contained in the box when the letter is forced forward against the endless ink-ribbon 156 passing over the faces of the several number-wheels. The ink-ribbon 156 passes around suitable guide-rollers and between the rollers 157 158, by means of which it is moved forward to present a new surface for printing. The shaft of the roller 157 is provided with a spur-wheel 159, which is engaged by an intermediate spur-wheel 160, taking motion from a spur-wheel 161 on the shaft 77.

In the letter-receiver 127 there are two openings 151', one near either end, and there are two sets of wheels for printing the numbers and the weight, so as to insure the printing of the weight and number on the envelope, even though it be a small one. On the side of the letter-receiver opposite that occupied by the number-wheels is arranged a shaft 162, on which are placed two printing-arms 163 for pushing the envelope against the number-wheels. As both printing-arms are alike a description of one will answer for both. The arm 163 has a forked free end, in which are journaled three rollers 164, 165, and 166, and between arms projecting from the forked end of the lever 163 toward the letter-receiver is journaled a roller 167.

Above the forked end of the arm 163 is supported the spool 168, on which is wound the plain paper strip 169, which extends downwardly and passes partly around and under the roller 164, thence to and partly around roller 167, thence to and partly around the roller 165 and between it and the roller 166, thence to the spool 170, on which it is wound by the weight 171 and cord 172 wound around and attached to the axis of the spool 170.

The shaft of the roller 165 is provided with a ratchet-wheel 173, which is engaged by a spring-pressed pawl 174 pivoted to a fixed support in the casing 1. Whenever the arm 163 swings back after making an impression a spring 164', attached to the arm 163, bears on the paper on the roller 164 and prevents it from moving by its own momentum. In the letter-receiver 127, opposite the roller 167, there is an opening 175 through which the said roller and its supporting-arms may project.

Shaft 162 is provided with a forked arm 176, in which is pivoted the sleeve 177, and in the said sleeve is inserted one end of the rod 178, the other end of which passes through a guide 179 pivoted to a fixed part of the frame of the machine. The end of the rod 178 which projects through the sleeve 177 is provided with a head, and upon the said rod a short distance below the sleeve is secured a collar 180, between which and the sleeve is placed a spiral spring 181. The lower end of the rod 178 is provided with a convex head 182, which is engaged by an arm 183 (practically a prolongation of arm 140) on the rock-shaft 91. On the rod 178, above the guide 179, is secured a collar 184, between which and the guide 179 is placed a spiral spring 185.

The bottom 128 of the letter-receiver is operated by a rod 186 passing through guides 187 188, attached to the framework of the machine. The end of the rod 186 which projects through guide 187 is provided with a head for engaging the arm 130, and on the said rod, near the guide 187, is secured a collar 189, between which and the guide is placed a spiral spring 190. The opposite end of the rod 186 is provided with a cam 191, which is engaged by a spring-pressed dog 192, pivoted to an arm 193, secured to the rock-shaft 91. The dog 192 rests against a lug projecting from the arm 193 while doing its work, but after it has slipped from the cam (as it is about to do when in the position shown in Fig. 10) and returned to the point of starting the dog folds over and escapes the cam.

In the top of casing 1 and adjoining the die 20 is pivoted an angled lever 194, one arm of which projects downward into the casing and is pivotally connected with the upper end of the rod 195. The other arm of the said lever projects over the die 20 and carries the cutter 196, which fits the die and is capable of cutting a rectangular piece from the paper strip 15, leaving the perforated strip to be wound upon the spool 23. The cutter 196 is cut away at the center to allow one end of the discharging-lever $196^2$ to project therein and be normally above the cutting-edges of the cutter. The lever $196^2$ is pivoted to the angled lever 194, and its shorter arm is pressed downwardly by the spiral spring $196^3$. When the cutter 196 passes below the edge of the die 20, the shorter arm of the lever $196^2$ strikes the fixed finger $196^4$, tilting the said lever, so as to insure the detachment of the receipt from the paper strip and die and cutter. The portion removed from the strip is the receipt for the letter, and when removed the receipt drops into the chute 197, supported in the casing 1, below the die 20. The chute has an open mouth, from which the receipt is removed by the fingers. The lower end of the rod 195 passes through a guide 196' in the lower part of the casing and is provided with a toe 197', which is engaged by a spring-pressed dog 198 pivoted to the arm 199 secured to the shaft 91. The dog 198 rests against a lug projecting from the arm 199 when it is in engagement with the toe 197'. On its return stroke the dog folds over and escapes the toe.

In the casing 1 is supported a knife-edge 200, which forms the fulcrum of the coin-operated lever 201. The longer arm of the lever 201 is provided with a pan 202 for receiving the coin, and the casing 1 has a slot 203 in the top thereof, near one end, for the insertion of the coin, and below the said slot is supported a coin-chute 204, which is curved to bring its lower end into position for discharging the coin dropped through the slot into the pan 202 when the lever 201 carrying the pan is in an elevated position, this position of the lever being determined by stop 205.

To the lever 123 carried by the shaft 91 is pivoted a rod 206, which is jointed to a bar 207 inserted in a mortise in the guide 208 and capable of sliding therein. In the guide 208 there are two apertures 209 210, and in the bar 207 there are corresponding apertures.

In a guide 211 adjoining the knife-edge 200 is inserted the rod 212, the lower end of which fits loosely in the aperture 209 in the guide 208 and is capable of entering the aperture in the bar 207. To the upper end of the rod 212 is pivoted a bar 213, having a knife-edge on its lower end, which enters a V-shaped notch 214 in the shorter arm of the lever 201. The rod 212 has sufficient weight to slightly overbalance the lever 201 when the pan 202 is empty and to hold the longer arm of the said lever normally in contact with the stop 205.

Cover 7 is provided with a catch 215, which is engaged by a hook-lever 216, pivoted to a fixed support and provided with an arm 217, which is connected with the lever 201 near its fulcrum by a rod 218. On shaft 8, which carries the covers 5 and 6, is secured a snail 219, and in a guide 220 below the shaft 8 is inserted the upper end of the rod 221, the lower end of which enters the aperture 210 in the guide 208. On the rod 221 is secured a collar 222, between which and the guide 208 is placed a spiral spring 223, which keeps the rod 221 in contact with the snail 219.

The lever 201, when depressed by a coin, drops into the position shown in dotted lines in Fig. 18, and there remains until the coin is discharged from the pan 202, when it is received by the coin-receptacle 224. The pan 202 has two longitudinal slots 225, and the discharge of the coin from the pan is effected by a fork 226 carried by a rod 227 and projecting upward at right angles from the said rod. The rod 227 passes through a guide 228, located near the coin-receptacle 224, and also through an ear 229 on the guide 208, and extends beyond the said ear and is provided with a head, which is engaged by the lever 230 pivoted to the bar 207. On the rod 227 is secured a collar 231, between which and the guide 228 is placed a spiral spring 232, which forces the rod 227 back after it has been moved forward in the operation of discharging a coin from the pan 202. The lever 230 is pivoted to the bar so as to swing freely on its pivot within certain limits. The rearward movement of its upper end is limited by the lug 233, projecting from the block 234, attached to the bar 207, as shown in Fig. 5. When the bar 207 moves forward it carries the rod 227 forward with it until the lower end of the lever 230 strikes the projection 234' on the guide 208, when the lever is tilted sufficiently to cause the head on the end of the rod 227 to slip off from the lever, when the spring 232 returns the rod to the point of starting. During its forward movement the fork 226 passes through the slots of the pan 202, forcing the coin beyond the edge of the pan, so that it falls into the coin-receptacle.

In the upper end of the coin-chute 204 there is a slot 235, to which is fitted a stop 236, formed on one end of the lever 237, the other end of which carries a roller which rests upon the paper strip 26. A spring 238 draws the lever end carrying the stop 236 toward the chute, thus causing the roller on the opposite end to bear upon the paper strip, and so long as the strip extends between the rollers 29 28 the stop will be prevented from entering the slot in the coin-chute, but as soon as the paper strip is exhausted the spring causes the stop 236 to enter the slot 235 and close the coin-chute, so that no more coin can be inserted.

To guard against tampering and to insure the proper use of the apparatus, safety devices are provided, which consist in a dash-pot or air-check to prevent the too-rapid movement of the operating-lever, a double pawl-and-ratchet arrangement to allow only complete strokes of the operating-lever, and a bell and hammer for indicating when the stroke of the operating-lever is complete.

To an ear projecting from the side of the casing is pivoted a pneumatic cylinder 238, provided with a piston 239, having a piston-rod 240, which is jointed to an arm 211, carried by the shaft 91. The cylinder 238 has in it a small aperture 242 for the ingress and egress of air. The resistance offered by the piston may be varied by varying the size of the aperture.

To the shaft 91 is secured an arm 243, in the free extremity of which is journaled a short shaft 244, carrying upon one end the pawl 245 and upon the other end the pawl 246, these pawls being oppositely arranged with respect to each other. The shaft 244 also carries an arm 247, having a V-shaped end, which extends downwardly between the springs projecting from the follower 248. The said follower is held by a guide 249 on the side of the arm 243, and is pressed outwardly into contact with the end of the V-shaped arm 247.

To a fixed support within the casing 1 is secured a double-curved ratchet-bar 250, which is concentric with the shaft 51. The teeth of the two parts of the ratchet-bar are oppositely arranged with respect to each other, and the arm 243 extends between the two parts, so that the pawl 245 engages the teeth of one part and the pawl 246 engages the teeth of the other part. At the ends of the double ratchet-bar are supported fingers 251 252 for engaging the pawls 245 246 when they reach the end of their excursion, and the convex end of the follower by engaging the arm 247 causes one or the other of the pawls to engage the ratchet-bar. By means of this construction the arm 243 is prevented from returning to the point of starting until after it has completed its stroke in one direction or the other.

To the frame of the machine, at equal distances from the shaft 91, are secured springs 253 253', carrying bell-hammers 254 at their extremities, and between the said bell-hammers and normally out of contact with them is supported a bell 255. Each spring 253 and 253' is provided with a spring-pressed dog 256, pivoted thereto and resting normally against a stop on the spring. To the shaft 91 is secured an arm 257, which is capable of engaging either dog 256, pressing it forward until it slips off the arm, when the return of the spring causes the bell-hammer to strike the bell, thus indicating that the stroke of the operating lever is complete. When the arm 257 returns, it meets no opposition from the dog 256.

The operation of my improved registering-machine is as follows: The letter to be registered is stamped and otherwise prepared for mailing as if it were to be dropped into a letter-box. The patron of the machine drops into the coin-slot 203 a coin of the required value, and the coin is delivered to the pan 202 by the chute 204. The pan then descends to the position shown in dotted lines in Fig. 18, and in so doing withdraws the rod 212 from the bar 207 and at the same time unlocks the cover 6 by tilting the hooked lever 216, so as to disengage it from the catch 215 on the cover 7. The cover 7 may now be raised, and by virtue of the connection of the said cover with the shaft or rod 8 cover 5 is also raised. The raising of the cover forces the rod 221 into the aperture in the bar 207, and thus locks the operating mechanism, so that the operating-shaft 91 cannot be moved. The letter to be registered is now dropped into the letter-receptacle and the receipt is filled out by the sender on the strip 26 by writing with a pencil through the aperture 3 on the strip 26, and the cover is closed, the platen is drawn down, and the impression is made on the inner part of the strip 26 and also on the strip 15. This operation allows the spring 223 to lift the rod 221 from the hole in the bar 207, thus releasing the shaft 91, so that the operating-lever 98 may be moved forward, thus moving forward the slide 134 and rolling the weight 138 along on the scale-beam 125 and at the same time carrying the dog 145 forward in the groove 142 of the cylinder 141, turning the said cylinder, and by virtue of its connection with the number-wheel 154 turning the number-wheel until the position of the weight 138 relative to the scale-beam 125 is such that the weight just counterbalances the letter. The scale-beam in its downward movement presses upon the dog 145 and disengages it from the groove 142 of the cylinder 141 and brings it into the position shown in Fig. 16. A further movement of the slide 134 brings the toothed end of the dog into engagement with the longitudinal grooves 143 of the cylinder, thus preventing the cylinder from turning, while permitting the slide 134 to move freely and allowing the shaft 91 to turn farther. The movement of the operating-lever 98 and shaft 91 causes a forward movement of the slide 119, thus operating the mechanism which prints on the strips 26 and 15, and at the same time it causes the shaft 162 to tilt and carry the arms 163 forward, causing the letter contained by the receiver 127 to be pressed against the ink-ribbon lying against the weight-number wheel and the wheels for giving the number of the letter, thus producing on the letter an impression of the weight and number of the letter. As the arm 163 moves forward, weight 171 takes up the slack in the strip 169 and the arm returns to the point of starting. The paper strip 169 is moved forward one space by the contact of the ratchet-wheel 173 with the pawl 174. The letter is dropped into the letter-receptacle by the tilting of the hinged bottom 128, when rod 186 moves forward as the operating-lever is returned to the point of starting. If the sender of the letter should fail to place the letter in the receptacle, the paper strip 169 would receive the impression, thus preserving a record of the fact. A further movement of the operating-handle turns the three sets of number-wheels for the next succeeding record and receipt simultaneously through the mechanism described, at the same time moving forward the paper strips 26 and 15 the proper distance for a new record and for the next receipt, and thus bringing the receipt just executed over the die 20, and the final movement of the operating-lever forces the cutter 196 through the die and punches out the receipt, which drops into the chute 197, where it is accessible to the sender of the letter. The last movement of the operating-lever in the same direction pushes the coin out of the pan 202, and the rod 212, in dropping into its normal position, raises the pan 202 to the point of starting and throws the hook-lever 216 into position for engaging the catch 215 when the cover 7 is closed, thus leaving the machine in condition for another operation. On returning the operating-lever to the point of starting the studs 120, carried by the slide 119, are made to pass the latches 117 118 and return to their original position in the straight groove without turning the cylinders 105 107, and the dog 145 follows the longitudinal grooves in the cylinder 141 until it can return to the spiral groove 142, when it drops into the said groove and returns the cylinder 141 to the point of starting.

In the modification shown in Fig. 36 the bottom of the letter-receptacle 127 consists of two doors 128' and 128², attached to rods 128³ 128⁴, furnished at one end of the receptacle with crank-arms 130' 130², which project inwardly toward each other and form an angle of about forty-five degrees with the doors with which they are connected. In a guide on the end of the receptacle 127 is placed a bar 260, the lower end of which is pivotally connected with the longer arm of the three-arm lever 129', which turns on the pivot 129². The arm of the lever above the pivot is engaged by the rod 186 and the arm which projects below the pivot is pressed by a spring 190'. The bar 260 has a curved cross-arm 261, the under surface of which is convex on the lower surface, which engages the crank-arms 130' 130². To the rods 128³ 128⁴ are attached arms 262 263, arranged at right angles to the doors 128' 128². The lower ends of these arms are drawn toward each other by a spring. When the rod 186 is moved forward by the mechanism already described, the lever 129' is tilted, bringing the cross-arm 261 into contact with the crank-arms 130' 130², thus opening the doors 128' 128², as indicated in dotted lines in Fig. 36, allowing the letter to drop vertically into the letter-box 131.

In the modification illustrated by Figs. 37 and 38 is shown a device for the prevention of the delivery of the receipt when no letter is deposited in the letter-receptacle. In this case the paper strip 169 (shown in Fig. 11) is dispensed with and the arm 163' is angled and provided at its free extremity with a pad 264 for pressing the letter contained in the receptacle 127 against the ink-ribbon resting on the number-wheels and on the number-plate, which designates the number of the machine, as previously described. A flat spring 265 is attached to the back of the arm 163' near its fulcrum, and its free angled end projects a short distance beyond the pad 264. In the casing 1 is journaled a rock-shaft 266, to which is secured an arm 267, projecting obliquely into the opening 151' and lying in the path of the end of the spring 265, so that if there is no letter in the receptacle 127 the spring will strike the arm 267 and rock the shaft 266, but if there is a letter in the receptacle the spring will be prevented from striking the arm 267. The rock-shaft 266 is prolonged to a point near the chute 197', when it is provided with an arm 268, which extends upwardly into the chute 197'. According to this modification the chute is provided with a plate 269, pivoted on a center 270, below the middle of the die 20. This pivoted plate forms a part of the chute and will normally rest in the position shown by the full lines in Fig. 38, so that the receipt cut out of the paper strip passing over the die 20 will be delivered to the front or outer portion of the chute, where it will be accessible to the party depositing the letter in the letter-box. If, however, the shaft 266 is rocked in consequence of the spring 265 striking the arm 267, the arm 268, which is carried by the shaft 266, engages a pin 271, projecting from the edge of the plate 269, and swings the plate on its pivot, so that it takes the position shown in broken lines in Fig. 38, and the catch 272 engages a shoulder 273 on the edge of the concave plate 274. Under these conditions the receipt instead of falling into the chute 197', where it can be reached, is delivered to an internal receptacle 275, from which it can be removed only by the person having access to the interior of the casing 1. The plate 269 remains in the position last described until the machine is again operated. To the shaft 8 is secured an arm 276, which extends downwardly into the casing 1, and carries at its free end a stud 277, which presses against the plate 269 below its pivot immediately after the disengagement of the catch 272 from the shoulder 273 by the end of the arm 276, as indicated in broken lines in Fig. 38, when the shaft 8 is rocked in the operation of opening the covers 5 and 6. The forward movement of the arm 276 returns the plate 269 to its normal position.

The opening by which the letters are removed may be adapted to receive a mail-pouch, so that the letter-gatherer can take up the letters without handling them.

The date-wheels are to be set daily by a person having the inspection of the machines on hand, or by some one at the hotel or other place of business at which the machine is located.

It will thus be seen that the apparatus cannot be opened until a coin of the proper weight is inserted in the coin-slot also that the several operations must occur in their regular order on account of the locking and checking devices. It will also be understood that a record is preserved when a receipt is taken without depositing the letter in the letter-receptacle, and, further, a duplicate receipt is preserved in the machine in such form that it can be removed from the machine as a book. This is accomplished by passing a wire through the upper slot 41 of the reel 34 and then tying it so that it will embrace all of the layers of paper, then cutting at the bottom the paper wound on the reel, and finally slipping the book out and attaching the paper to the reel for a new series of records.

It will be seen that the perforated strip 15 from which the receipt is punched contains perforations equal in number to the number of receipts delivered. Therefore the perforated strip forms a permanent record of the number of receipts delivered and is a check on the recording mechanism.

Although my apparatus is especially adapted to the registering of letters and other mail matter, I do not limit or confine myself to this use, as it may be applied to analogous uses.

Having thus described my invention, I claim as new and desire to secure by Letters Patent—

1. In a registering machine, the combination with a writing and printing surface, of printing mechanism, a cover and a locking device for rendering the writing and printing surface inaccessible, a coin-operated unlocking device for releasing the cover, and locking mechanism operatively connected with the cover, for locking the printing mechanism when the cover is open, substantially as specified.

2. In a registering machine, the combination of a writing table and date and number-printing mechanism, a paper strip extending over the writing table and printing types, for receiving a record, a reel for receiving the paper strip, mechanism for operating the reel, a cover and locking device provided with a coin-operated releaser for rendering the writing and printing surface inaccessible except at times when the lock is released by a coin, and locking mechanism operatively connected with the cover, for locking the printing mechanism when the cover is open, substantially as specified.

3. In a registering machine, the combination of an apertured table adapted for receiving a paper strip for writing or printing, date and number wheels having figured or lettered faces projecting through the table, platens for pressing paper down upon the date and number wheels, and a double lever for operating the platens simultaneously, substantially as specified.

4. In a registering machine, the combination of a writing table, two paper strips extending over the table, devices for producing impressions simultaneously on the two strips of paper, feeding mechanism for carrying the two strips of paper forward, a cutter punch for cutting the impressed portion of one strip out of the strip, leaving the strip perforated but continuous and means for storing the strips, substantially as specified.

5. In a registering machine, the combination, with the book-forming reel, provided with paper-holding arms having slotted ends of the movable knife for cutting the paper on the reel, substantially as specified.

6. In a registering machine, the combination with the letter box, of a weighing scale provided with a narrow, deep letter receptacle having parallel sides and furnished with a hinged bottom constructed to discharge the weighed letter into the letter box, substantially as specified.

7. The combination, with the beam of the letter weighing scale, of a rolling weight, and a yielding adjusting arm for moving the weight along the scale beam, substantially as specified.

8. The combination of a scale, a letter receptacle suspended from the shorter arm of the scale beam, a rolling weight adapted to roll on the scale beam, a wheel provided with figures for printing, and means for moving the weight and turning the printing wheel simultaneously, substantially as specified.

9. In a registering machine, the combination, with the scale and the weight-moving and printing wheel turning devices, of a positive stop formed of a cylinder having deep and shallow grooves, and a dog fitted to the deep groove and provided with teeth for entering the shallow grooves for stopping and holding the printing wheel as the scale beam drops, substantially as specified.

10. In a registering machine, the combination, with the scale provided with a letter receptacle, of printing mechanism constructed to print on the letter while it is in the letter receptacle, substantially as specified.

11. In a registering machine, the combination, with the letter receptacle and receipt delivering chute, of mechanism for preventing the delivery of the receipt in the absence of a letter in the letter receptacle, substantially as specified.

12. In a registering machine, the combination, with the registering and weighing mechanism, of two sets of numbering wheels, and mechanism for setting both sets simultaneously, one set being constructed for printing on the record strip and receipt, the other set being for printing upon the letter, substantially as specified.

13. In a registering machine, the combination with the covers of the writing table, letter receptacle and shaft carrying the covers, of the cam carried by the cover shaft, an operating lever, and locking mechanism operated by the cam on the cover shaft, whereby the operating mechanism is locked while the covers are open, substantially as specified.

14. In a registering machine, the combination with the operating shaft, of a check comprising two fixed ratchet bars oppositely arranged with respect to each other, and an arm carried by the shaft and provided with pawls for engaging the ratchet bars, and tripping devices for shifting the pawls, for compelling the complete movement of the operating shaft in either direction, substantially as specified.

15. In a registering machine, the combination, with the coin chute and record strip, of a spring pressed coin chute closing lever resting on and controlled by the record strip, substantially as specified.

16. The combination with the coin discharging fork, of a trip lever carried by the locking bar of the operating shaft and adapted to move forward and release the fork-carrying rod, substantially as specified.

17. The combination in a registering machine, of letter numbering mechanism, printing mechanism for recording the numbers of the letters a paper strip for receiving the record of the numbers of the letters, mechanism for moving the paper strip forward with a step by step motion, an automatic storage reel for receiving the paper strip after it is printed, and mechanism for operating the automatic reel, substantially as specified.

18. The combination with the letter-weighing scales, of a letter receptacle suspended from the scale beam, a cover, a locking device for the same, a hinged bottom for retaining the letter temporarily, printing mechanism for printing on the letter, and mechanism for opening the hinged bottom and discharging the contents of the letter receptacle after opening, substantially as specified.

19. The combination, with a letter box and weighing scales connected with the box, of a letter receptacle having vertical parallel sides and ends supported by the weighing scales and having a hinged bottom, and mechanism for opening the said hinged bottom, substantially as specified.

20. In a registering machine, the combination with letter-weighing scales, of a letter receptacle suspended from the scale beam, a cover fitted to the receptacle operatively connected with the operating mechanism of the registering machine, a hinged bottom connected with the receptacle, and mechanism for operating the hinged bottom for discharging a letter from the box, substantially as specified.

21. In a registering machine, the combination of the scale having an adjustable weight, a spirally grooved cylinder provided with straight longitudinal grooves, a dog movable with the scale weight and adapted to engage the spiral or straight grooves of the cylinder, and figure wheels connected with the cylinder, substantially as specified.

22. The combination, with a reel having transversely grooved extension arms for receiving the record strip, of a movable knife constructed to project into and slide through the slots of the arms, and knife-carrying guide, substantially as specified.

23. The combination, with the number wheels, of a spirally grooved cylinder provided with a straight longitudinal groove connecting the ends of the spiral groove, an actuating slide provided with a stud projecting into the spiral groove, and latches for compelling the stud to pass from the spiral groove to the longitudinal groove at one end of the cylinder, and compelling the stud to pass from the longitudinal groove to the spiral groove at the opposite end of the cylinder, substantially as specified.

24. In a registering machine, the combination with the record-forming devices, of an inclosed cutter and die for cutting the receipt from the record strip, leaving the strip perforated but continuous mechanism for carrying the strip between the cutter and die with a step by step motion a locking device for preventing access to the inclosed cutter and die and a chute for receiving and holding the receipt, substantially as specified.

25. In a registering machine, the combination with the operating shaft, of an arm carrying a double pawl, a double acting spring for completing the throw of the pawl in either direction, and a curved ratchet bar provided with two sets of ratchet teeth oppositely arranged with respect to each other and furnished with two pawl-tripping fingers, substantially as specified.

26. The combination with the operating shaft, of an arm carried by the shaft, pawl and ratchet mechanism operatively connected with the operating shaft for insuring the completion of the movement of the shaft in either direction two spring bell hammers provided with spring dogs for engagement with the arm, after the arm has completed its stroke in either of the two directions in which it moves and a bell placed between the hammers for giving a notice of the completion of the stroke of the operating shaft in either direction, substantially as specified.

DETALMO DI BRAZZA SAVORGNAN.

Witnesses:
C. SEDGWICK,
GEO. M. HOPKINS.